US012553864B2

(12) United States Patent
Agrawal et al.

(10) Patent No.: US 12,553,864 B2
(45) Date of Patent: Feb. 17, 2026

(54) PHOTOACOUSTIC DEVICES AND SYSTEMS INCLUDING ONE OR MORE LIGHT GUIDE COMPONENTS

(71) Applicant: QUALCOMM Incorporated, San Diego, CA (US)

(72) Inventors: Sumit Agrawal, Sunnyvale, CA (US); Ali Lopez, Dublin, CA (US); Hrishikesh Vijaykumar Panchawagh, Cupertino, CA (US); Kostadin Dimitrov Djordjev, Los Gatos, CA (US); Camilo Perez Saaibi, Dublin, CA (US); Legardo Reyes, Fremont, CA (US); Nicholas Buchan, San Jose, CA (US); Ila Badge, San Jose, CA (US); Chin-Jen Tseng, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/069,901

(22) Filed: Dec. 21, 2022

(65) Prior Publication Data
US 2024/0210359 A1    Jun. 27, 2024

(51) Int. Cl.
*G01N 29/24*    (2006.01)
*G01N 21/01*    (2006.01)
(Continued)

(52) U.S. Cl.
CPC ......... *G01N 29/2418* (2013.01); *G01N 21/01* (2013.01); *G01N 21/1702* (2013.01);
(Continued)

(58) Field of Classification Search
CPC .................. G01N 29/2418; A61B 5/0095
See application file for complete search history.

(56) References Cited

U.S. PATENT DOCUMENTS

| 5,348,002 A | * | 9/1994 | Caro | G01N 29/449 |
| | | | | 356/41 |
| 6,236,455 B1 | * | 5/2001 | Autrey | G01N 21/1702 |
| | | | | 356/432 |

(Continued)

FOREIGN PATENT DOCUMENTS

| CN | 109363644 B | 4/2021 |
| EP | 2933633 A1 | 10/2015 |
| JP | 2019164104 A | 9/2019 |

OTHER PUBLICATIONS

International Search Report and Written Opinion—PCT/US2023/079140—ISA/EPO—Mar. 19, 2024.

*Primary Examiner* — Jonathan M Hansen
*Assistant Examiner* — Mohamed Doumbia
(74) *Attorney, Agent, or Firm* — QUALCOMM Incorporated

(57) ABSTRACT

An apparatus may include a platen, a light source system and a receiver system. The light source system may at least a first light-emitting component and at least a first light guide component. The first light guide component may be configured to transmit light from the first light-emitting component towards a target object in contact with a first area of the platen. The receiver system may include at least two receiver stack portions. A first receiver stack portion may reside proximate a first side of a first portion of the first light guide component and a second receiver stack portion may reside proximate a second side of the first portion of the first light guide component. The receiver system may be configured to detect acoustic waves corresponding to a photoacoustic response of the target object to light emitted by the light source system.

28 Claims, 17 Drawing Sheets

(51) Int. Cl.
  *G01N 21/17* (2006.01)
  *G01N 21/88* (2006.01)
  *G01N 29/22* (2006.01)

(52) U.S. Cl.
  CPC ....... *G01N 21/8806* (2013.01); *G01N 29/223* (2013.01); *G01N 2021/0106* (2013.01); *G01N 2021/8845* (2013.01)

(56) References Cited

U.S. PATENT DOCUMENTS

| | | | |
|---|---|---|---|
| 9,351,705 B2* | 5/2016 | Wang | A61B 8/4461 |
| 2009/0227870 A1* | 9/2009 | Kolkman | G01N 29/50 |
| | | | 600/447 |
| 2013/0039147 A1* | 2/2013 | Witte | G01S 15/02 |
| | | | 367/7 |
| 2014/0249381 A1* | 9/2014 | LeBoeuf | A61B 5/0261 |
| | | | 600/301 |
| 2015/0122036 A1* | 5/2015 | Ida | G01H 9/00 |
| | | | 73/655 |
| 2015/0133765 A1 | 5/2015 | Ichihara et al. | |
| 2019/0220642 A1* | 7/2019 | Lu | G06V 40/1382 |
| 2019/0377962 A1* | 12/2019 | Kitchens | A61B 5/0095 |
| 2022/0175258 A1 | 6/2022 | Kitchens et al. | |

\* cited by examiner

PHOTOACOUSTIC DEVICES AND SYSTEMS INCLUDING ONE OR MORE LIGHT GUIDE COMPONENTS

CROSS-REFERENCE TO RELATED APPLICATIONS

This application is related to U.S. patent application Ser. No. 18/069,859, entitled "PHOTOACOUSTIC DEVICES AND SYSTEMS," to U.S. patent application Ser. No. 18/069,877, entitled "SEMI-COMPACT PHOTOACOUSTIC DEVICES AND SYSTEMS," to U.S. patent application Ser. No. 18/069,882, entitled "SEMI-COMPACT PHOTOACOUSTIC DEVICES AND SYSTEMS," to U.S. patent application Ser. No. 18/069,885, entitled "SEMI-COMPACT PHOTOACOUSTIC DEVICES AND SYSTEMS," to U.S. patent application Ser. No. 18/069,888, entitled "SEMI-COMPACT PHOTOACOUSTIC DEVICES AND SYSTEMS" and to U.S. patent application Ser. No. 18/069,893, entitled "SEMI-COMPACT PHOTOACOUSTIC DEVICES AND SYSTEMS," all of which are hereby incorporated by reference in their entireties and for all purposes.

TECHNICAL FIELD

This disclosure relates generally to photoacoustic devices and systems.

DESCRIPTION OF RELATED TECHNOLOGY

A variety of different sensing technologies and algorithms are being implemented in devices for various biometric and biomedical applications, including health and wellness monitoring. This push is partly a result of the limitations in the usability of traditional measuring devices for continuous, noninvasive and ambulatory monitoring. Some such devices are, or include, photoacoustic devices. Although some previously-deployed photoacoustic devices and systems can provide acceptable results, improved photoacoustic devices and systems would be desirable.

SUMMARY

The systems, methods and devices of this disclosure each have several aspects, no single one of which is solely responsible for the desirable attributes disclosed herein.

One innovative aspect of the subject matter described in this disclosure can be implemented in an apparatus. The apparatus may include a platen, a light source system and a receiver system. The receiver system may be, or may include, an ultrasonic receiver system. In some implementations, a mobile device (such as a wearable device, a cellular telephone, etc.) may be, or may include, at least part of the apparatus.

In some examples, the light source system may be configured to emit light through a first area of the platen towards a target object in contact with the first area of the platen. According to some examples, the light source system may include at least a first light-emitting component and at least a first light guide component. In some examples, the first light guide component may be configured to transmit light from the first light-emitting component to the first area of the platen. In some examples, at least the first area of the platen may be transparent. In some examples, the first light guide component may include at least one optical fiber.

According to some examples, the receiver system may include at least two receiver stack portions. In some such examples, a first receiver stack portion may reside proximate a first side of a first portion of the first light guide component and a second receiver stack portion may reside proximate a second side of the first portion of the first light guide component. In some examples, the receiver system may be configured to detect acoustic waves corresponding to a photoacoustic response of the target object to light emitted by the light source system. In some examples, the first receiver stack portion may reside proximate a second area of the platen on a first side of the first area and the second receiver stack portion may reside proximate a third area of the platen on a second and opposite side of the first area.

In some examples, the first receiver stack portion and the second receiver stack portion may be portions of a first receiver stack ring. According to some examples, the first receiver stack ring may be configured to surround the first portion of the first light guide component. In some examples, an annular area of the platen proximate the first receiver stack ring may be configured to surround the first area of the platen. In some examples, the apparatus also may include a second receiver stack ring. According to some such examples, the second receiver stack ring may be configured to surround the first receiver stack ring. In some examples, the light source system may include at least a second light guide component. In some such examples, the second light guide component may be configured to transmit light from the first light-emitting component to a second area of the platen. In some examples, the second receiver stack ring may surround the second area of the platen.

In some examples, the light source system may include at least a second light-emitting component and at least a second light guide component. According to some such examples, the second light guide component may be configured to transmit light from the second light-emitting component to at least a portion of the first light guide component.

According to some examples, the receiver system may include a linear array of receiver stack portions. In some examples, the receiver system may include a two-dimensional array of receiver stack portions.

In some examples, the first receiver stack portion may reside between a first portion of the first light-emitting component and the platen and the second receiver stack portion may reside between a second portion of the first light-emitting component and the platen.

According to some examples, at least one of the first receiver stack portion or the second receiver stack portion may reside between a second portion of the first light guide component and the platen. According to some such examples, the apparatus also may include at least one electromagnetic shielding layer residing between the first light-emitting component and the receiver system.

In some examples, the light source system may include at least a first light-coupling component configured to couple light from the first light-emitting component to the first light guide component.

According to some examples, the first light-emitting component may be configured to emit laser pulses. According to some such examples, the laser pulses may be in a wavelength range of 500 nm to 1000 nm. In some examples, the first light-emitting component may be configured to emit laser pulses at pulse widths in a range from 3 nanoseconds to 1000 nanoseconds.

In some examples, a combined thickness of the platen and the receiver stack portions may be in a range from 2 mm to 8 mm.

According to some examples, the apparatus also may include a mirror system may include a first mirror portion residing between the platen and the first receiver stack portion and a second mirror portion residing between the platen and the second receiver stack portion.

In some implementations, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some examples, the control system may be configured to control the light source system. In some examples, the control system may be further configured to receive, from the receiver system, signals corresponding to the acoustic waves. According to some examples, the control system may be further configured to estimate one or more cardiac features based, at least in part, on the signals.

Other innovative aspects of the subject matter described in this disclosure can be implemented in a method. In some examples, the method may involve causing a light source system to emit light through a first area of a platen towards a target object in contact with the first area of the platen. According to some examples, the light source system may include at least a first light-emitting component and at least a first light guide component. In some examples, the first light guide component may be configured to transmit light from the first light-emitting component to the first area of the platen.

According to some examples, the method may involve receiving, from a receiver system, signals corresponding to acoustic waves caused by a photoacoustic response of the target object to light emitted by the light source system. In some examples, the receiver system may include at least two receiver stack portions, a first receiver stack portion residing proximate a first side of a first portion of the first light guide component and a second receiver stack portion residing proximate a second side of the first portion of the first light guide component. According to some examples, causing the light source system to emit light may involve causing the light source system to emit laser pulses.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. The software may include instructions for controlling one or more devices to perform one or more disclosed methods.

In some examples, the method may involve causing a light source system to emit light through a first area of a platen towards a target object in contact with the first area of the platen. According to some examples, the light source system may include at least a first light-emitting component and at least a first light guide component. In some examples, the first light guide component may be configured to transmit light from the first light-emitting component to the first area of the platen.

According to some examples, the method may involve receiving, from a receiver system, signals corresponding to acoustic waves caused by a photoacoustic response of the target object to light emitted by the light source system. In some examples, the receiver system may include at least two receiver stack portions, a first receiver stack portion residing proximate a first side of a first portion of the first light guide component and a second receiver stack portion residing proximate a second side of the first portion of the first light guide component. According to some examples, causing the light source system to emit light may involve causing the light source system to emit laser pulses.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
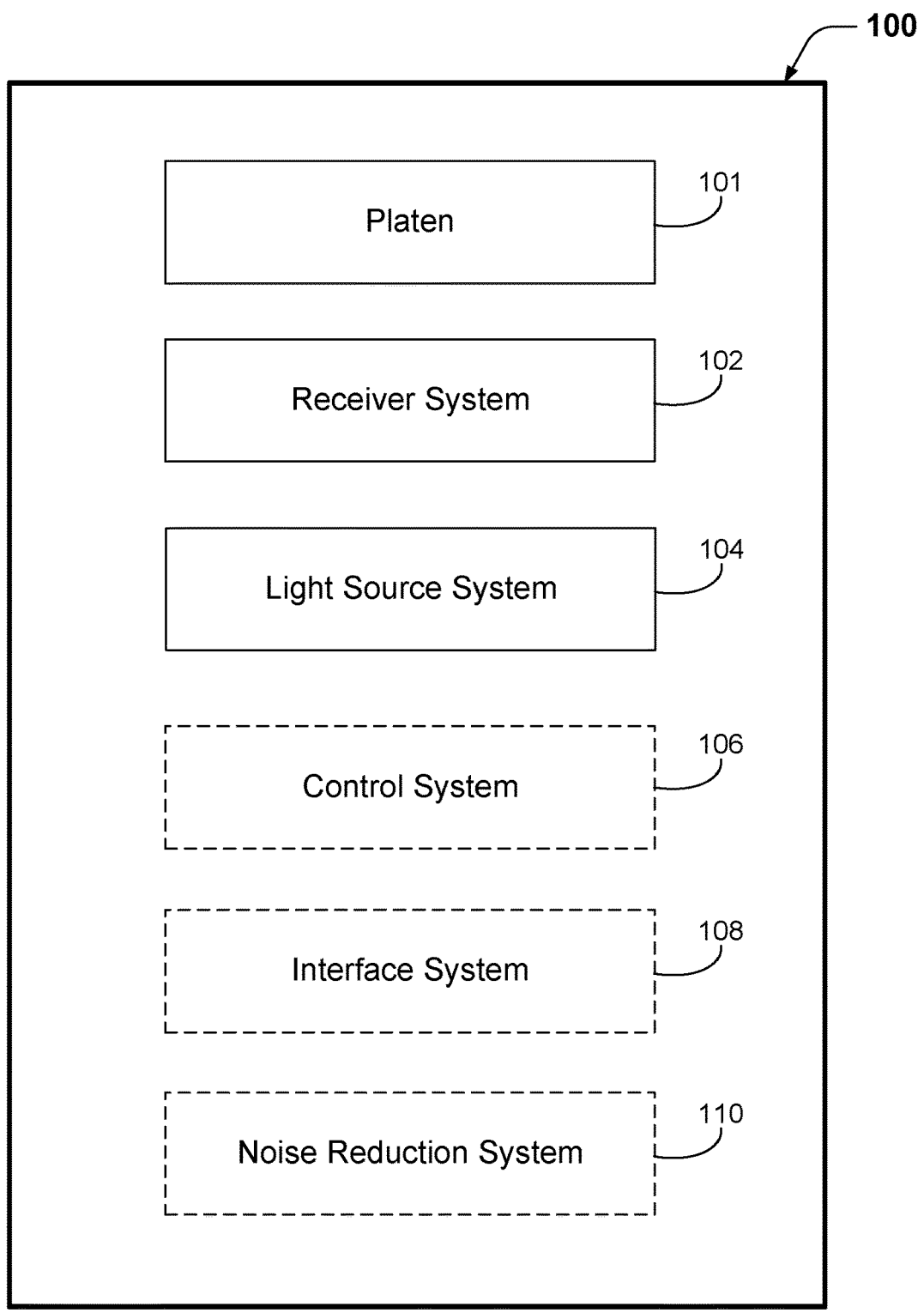
FIG. 1 is a block diagram that shows example components of an apparatus according to some disclosed implementations.

The following description is directed to certain implementations for the purposes of describing various aspects of this disclosure. However, a person having ordinary skill in the art will readily recognize that the teachings herein can be applied in a multitude of different ways. Some of the concepts and examples provided in this disclosure are especially applicable to blood pressure monitoring applications. However, some implementations also may be applicable to other types of biological sensing applications, as well as to other fluid flow systems. The described implementations may be implemented in any device, apparatus, or system that includes an apparatus as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), architectural structures, microwaves, refrigerators, stereo systems, cassette recorders or players, DVD players, CD players, VCRs, radios, portable memory chips, washers, dryers, washer/dryers, parking meters, automobile doors, autonomous or semi-autonomous vehicles, drones, Internet of Things (IoT) devices, etc. Thus, the teachings are not intended to be limited to the specific implementations depicted and described with reference to the drawings; rather, the teachings have wide applicability as will be readily apparent to persons having ordinary skill in the art.

Non-invasive health monitoring devices, such as photoacoustic plethysmography (PAPG)-based devices, have various potential advantages over more invasive health monitoring devices such as cuff-based or catheter-based blood pressure measurement devices. However, it has proven to be difficult to design satisfactory compact, or semi-compact, PAPG-based devices. (Some "semi-compact" devices may have a length in the range of 5.0 mm to 40 mm. Some semi-compact devices may have a cross-sectional area in the range of 6.0 mm$^2$ to 50 mm$^2$. A "compact" device is a device that is smaller than a semi-compact device.) For example, some semi-compact devices that have recently been developed by the present assignee to mitigate artifact signals such as electromagnetic interference (EMI) signals, signals from reflected light and signals from reflected acoustic waves, may be too large to deploy conveniently in a wearable device, such as a watch, a patch or an ear bud.

Some disclosed devices include a platen, a light source system and a receiver system. The receiver system may be, or may include, an ultrasonic receiver system. According to some implementations, the light source system may be configured to emit light through a first area of the platen towards a target object in contact with the first area of the platen. In some implementations, the light source system may include at least a first light-emitting component and at least a first light guide component. In some such implementations, the first light guide component may be configured to transmit light from the first light-emitting component to the first area of the platen. According to some implementations, the receiver system may include at least two receiver stack portions: a first receiver stack portion may reside proximate a first side of a first portion of the first light guide component and a second receiver stack portion may reside proximate a second side of the first portion of the first light guide component. The first receiver stack portion and the second receiver stack portion may, in some examples, be portions of a receiver stack ring. The receiver system may be configured to detect acoustic waves corresponding to a photoacoustic response of the target object to light emitted by the light source system. In some implementations, the apparatus may include an anti-reflective layer, a mirror layer, or combinations thereof. As used herein, "anti-reflective" refers to properties of light. Accordingly, an anti-reflective layer is a layer that is configured to reduce light reflection.

Particular implementations of the subject matter described in this disclosure can be implemented to realize one or more of the following potential advantages. Various disclosed configurations include PAPG-capable devices that are compact enough to reside in a wearable device. Configurations in which the receiver stack portions flank, or surround, a central light source can enhance the sensitivity of the device to received photoacoustic waves, such as arterial photoacoustic waves. According to some implementations, the receiver system may be shielded from electromagnetic interference (EMI) caused by circuitry of the light source system, shielded from light emitted by the light source system, shielded from light reflected by the platen, or combinations thereof. In some such implementations, the light source system circuitry and the light-emitting portion(s) may be laterally offset from the receiver system, which can result in even less EMI reaching the receiver system. In some examples, acoustic impedance matching layers may mitigate unwanted reflections of acoustic waves, thereby mitigating another type of noise.

FIG. 1 is a block diagram that shows example components of an apparatus according to some disclosed implementations. In this example, the apparatus 100 includes a platen 101, a receiver system 102 and a light source system 104. Some implementations of the apparatus 100 may include a control system 106, an interface system 108, a noise reduction system 110, or combinations thereof.

Various examples of platens 101 and various configurations of light source systems 104 and receiver systems 102 are disclosed herein. Some examples are described in more detail below. The platen 101 may be made of any suitable material, such as glass, acrylic, polycarbonate, etc.

According to some examples, the platen 101 (or another portion of the apparatus) may include one or more anti-reflective layers. In some examples, one or more anti-reflective layers may reside on, or proximate, one or more outer surfaces of the platen 101.

In some examples, at least a portion of the outer surface of the platen 101 may have an acoustic impedance that is configured to approximate an acoustic impedance of human skin. The portion of the outer surface of the platen 101 may, for example, be a portion that is configured to receive a target object, such as a human digit. (As used herein, the terms "finger" and "digit" may be used interchangeably, such that a thumb is one example of a finger.) A typical range of acoustic impedances for human skin is 1.53-1.680 MRayls. In some examples, at least an outer surface of the platen 101 may have an acoustic impedance that is in the range of 1.4-1.8 MRayls, or in the range of 1.5-1.7 MRayls. Alternatively, or additionally, in some examples at least an outer surface of the platen 101 may be configured to conform to a surface of human skin. In some such examples, at least an outer surface of the platen 101 may have material properties like those of putty or chewing gum.

In some examples, at least a portion of the platen 101 may have an acoustic impedance that is configured to approximate an acoustic impedance of one or more receiver elements of the receiver system 102. According to some examples, a layer residing between the platen 101 and one or more receiver elements may have an acoustic impedance that is configured to approximate an acoustic impedance of the one or more receiver elements. Alternatively, or additionally, in some examples a layer residing between the platen 101 and one or more receiver elements may have an acoustic impedance that is in an acoustic impedance range between an acoustic impedance of the platen and an acoustic impedance of the one or more receiver elements.

In some examples, the light source system 104 may be configured to emit light through a first area of the platen 101 towards a target object in contact with the first area of the platen 101. According to some examples, the light source system 104 may include at least a first light-emitting component and at least a first light guide component. In some examples, the light guide component(s) may include one or more optical fibers. The first light guide component may be configured to transmit light from the first light-emitting component to the first area of the platen.

According to some examples, the receiver system 102 may include at least two receiver stack portions: a first receiver stack portion may reside proximate a first side of a first portion of the first light guide component and a second receiver stack portion may reside proximate a second side of the first portion of the first light guide component. The first receiver stack portion and the second receiver stack portion may, in some examples, be portions of a first receiver stack ring. The receiver stack ring may be configured to surround the first portion of the first light guide component. In some examples, the receiver system 102 may be configured to detect acoustic waves corresponding to a photoacoustic response of the target object to light emitted by the light source system.

Various examples of receiver systems 102 are disclosed herein, some of which may include ultrasonic receiver systems, optical receiver systems, or combinations thereof. In some implementations in which receiver systems 102 is, or includes, an ultrasonic receiver system, the ultrasonic receiver and an ultrasonic transmitter may be combined in an ultrasonic transceiver. In some examples, the receiver system 102 may include a piezoelectric receiver layer, such as a layer of polyvinylidene difluoride (PVDF) polymer, polyvinylidene fluoride-trifluoroethylene (PVDF-TrFE) copolymer, a piezoelectric composite, etc. In some implementations, a single piezoelectric layer may serve as an ultrasonic receiver. In some implementations, other piezoelectric materials may be used in the piezoelectric layer, such as aluminum nitride (AlN) or lead zirconate titanate (PZT). The receiver system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some examples, the receiver system 102 may be, or may include, an ultrasonic receiver array. In some examples, the apparatus 100 may include one or more separate ultrasonic transmitter elements. In some such examples, the ultrasonic transmitter(s) may include an ultrasonic plane-wave generator.

The light source system 104 may, in some examples, include one or more light-emitting diodes. In some implementations, the light source system 104 may include one or more laser diodes. According to some implementations, the light source system 104 may include one or more vertical-cavity surface-emitting lasers (VCSELs). In some implementations, the light source system 104 may include one or more edge-emitting lasers. In some implementations, the light source system may include one or more neodymium-doped yttrium aluminum garnet (Nd:YAG) lasers.

In some examples, the light source system 104 may be configured to emit laser pulses in a wavelength range of 500 nm to 1000 nm. The light source system 104 may, in some examples, be configured to transmit light in one or more wavelength ranges. In some examples, the light source system 104 may configured for transmitting light in a wavelength range of 500 to 600 nanometers (nm). According to some examples, the light source system 104 may configured for transmitting light in a wavelength range of 800 to 950 nm. In view of factors such as skin reflectance, fluence, the absorption coefficients of blood and various tissues, and skin safety limits, one or both of these wavelength ranges may be suitable for various use cases. For example, the wavelength ranges of 500 nm to 600 nm and of 800 to 950 nm may both be suitable for obtaining photoacoustic responses from relatively smaller, shallower blood vessels, such as blood vessels having diameters of approximately 0.5 mm and depths in the range of 0.5 mm to 1.5 mm, such as may be found in a finger. The wavelength range of 800 to 950 nm may, for example, be suitable for obtaining photoacoustic responses from relatively larger, deeper blood vessels, such as blood vessels having diameters of approximately 2.0 mm and depths in the range of 2 mm to 3 mm, such as may be found in an adult wrist.

The light source system 104 may include various types of drive circuitry, depending on the particular implementation. In some disclosed implementations, the light source system 104 may include at least one multi-junction laser diode, which may produce less noise than single-junction laser diodes. In some examples, the light source system 104 may include a drive circuit (also referred to herein as drive circuitry) configured to cause the light source system to emit pulses of light at pulse widths in a range from 3 nanoseconds to 1000 nanoseconds. According to some examples, the light source system 104 may include a drive circuit configured to cause the light source system to emit pulses of light at pulse repetition frequencies in a range from 1 kilohertz to 100 kilohertz.

In some implementations, the apparatus (for example, the receiver system 102, the light source system 104, or both) may include one or more sound-absorbing layers, acoustic isolation material, light-absorbing material, light-reflecting material, or combinations thereof. In some examples, acoustic isolation material may reside between the light source system 104 and at least a portion of the receiver system 102. In some examples, the apparatus (for example, the receiver system 102, the light source system 104, or both) may include one or more electromagnetically shielded transmission wires. In some such examples, the one or more electromagnetically shielded transmission wires may be configured to reduce electromagnetic interference from the light source system 104 that is received by the receiver system 102.

In some implementations, the light source system 104 may be configured for emitting various wavelengths of light, which may be selectable to trigger acoustic wave emissions primarily from a particular type of material. For example, because the hemoglobin in blood absorbs near-infrared light very strongly, in some implementations the light source system 104 may be configured for emitting one or more wavelengths of light in the near-infrared range, in order to trigger acoustic wave emissions from hemoglobin. However, in some examples the control system 106 may control the wavelength(s) of light emitted by the light source system 104 to preferentially induce acoustic waves in blood vessels, other soft tissue, and/or bones. For example, an infrared (IR) light-emitting diode LED may be selected and a short pulse of IR light emitted to illuminate a portion of a target object and generate acoustic wave emissions that are then detected by the receiver system 102. In another example, an IR LED and a red LED or other color such as green, blue, white or ultraviolet (UV) may be selected and a short pulse of light emitted from each light source in turn with ultrasonic images obtained after light has been emitted from each light source. In other implementations, one or more light sources of different wavelengths may be fired in turn or simultaneously to generate acoustic emissions that may be detected by the ultrasonic receiver. Image data from the ultrasonic receiver that is obtained with light sources of different wavelengths and at different depths (e.g., varying RGDs) into the target object may be combined to determine the location and type of material in the target object. Image contrast may occur as materials in the body generally absorb light at different wavelengths differently. As materials in the body absorb light at a specific wavelength, they may heat differentially and generate acoustic wave emissions with sufficiently short pulses of light having sufficient intensities. Depth contrast may be obtained with light of different wavelengths and/or intensities at each selected wavelength. That is, successive images may be obtained at a fixed RGD (which may correspond with a fixed depth into the target object) with varying light intensities and wavelengths to detect materials and their locations within a target object. For example, hemoglobin, blood glucose or blood oxygen within a blood vessel inside a target object such as a finger may be detected photoacoustically.

According to some implementations, the light source system 104 may be configured for emitting a light pulse with a pulse width less than about 100 nanoseconds. In some implementations, the light pulse may have a pulse width between about 10 nanoseconds and about 500 nanoseconds or more. According to some examples, the light source system may be configured for emitting a plurality of light pulses at a pulse repetition frequency between 10 Hz and 100 kHz. Alternatively, or additionally, in some implementations the light source system 104 may be configured for emitting a plurality of light pulses at a pulse repetition frequency between about 1 MHz and about 100 MHz. Alternatively, or additionally, in some implementations the light source system 104 may be configured for emitting a plurality of light pulses at a pulse repetition frequency between about 10 Hz and about 1 MHz. In some examples, the pulse repetition frequency of the light pulses may correspond to an acoustic resonant frequency of the ultrasonic receiver and the substrate. For example, a set of four or more light pulses may be emitted from the light source system 104 at a frequency that corresponds with the resonant frequency of a resonant acoustic cavity in the sensor stack, allowing a build-up of the received ultrasonic waves and a higher resultant signal strength. In some implementations, filtered light or light sources with specific wavelengths for detecting selected materials may be included with the light source system 104. In some implementations, the light source system may contain light sources such as red, green and blue LEDs of a display that may be augmented with light sources of other wavelengths (such as IR and/or UV) and with light sources of higher optical power. For example, high-power laser diodes or electronic flash units (e.g., an LED or xenon flash unit) with or without filters may be used for short-term illumination of the target object.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be configured for receiving and processing data from the receiver system 102, e.g., as described below. If the apparatus 100 includes an ultrasonic transmitter, the control system 106 may be configured for controlling the ultrasonic transmitter. In some implementations, functionality of the control system 106 may be partitioned between one or more controllers or processors, such as a dedicated sensor controller and an applications processor of a mobile device.

In some examples, the control system 106 may be configured to control the light source system 104. For example, the control system 106 may be configured to control one or more light-emitting portions of the light source system 104 to emit laser pulses. The laser pulses may, in some examples, be in a wavelength range of 500 nm to 1000 nm. The laser pulses may, in some examples, have pulse widths in a range from 3 nanoseconds to 1000 nanoseconds. In some examples, the control system 106 may be configured to receive signals from the ultrasonic receiver system 102 corresponding to the ultrasonic waves generated by the target object responsive to the light from the light source system 104. In some examples, the control system 106 may be configured to estimate one or more cardiac features based, at least in part, on the signals. According to some examples, the cardiac features may be, or may include, blood pressure.

Some implementations of the apparatus 100 may include the interface system 108. In some examples, the interface system 108 may include a wireless interface system. In some implementations, the interface system 108 may include a user interface system, one or more network interfaces, one or more interfaces between the control system 106 and a memory system and/or one or more interfaces between the control system 106 and one or more external device interfaces (e.g., ports or applications processors), or combinations thereof. According to some examples in which the interface system 108 is present and includes a user interface system, the user interface system may include a microphone system, a loudspeaker system, a haptic feedback system, a voice command system, one or more displays, or combinations thereof. According to some examples, the interface system 108 may include a touch sensor system, a gesture sensor system, or a combination thereof. The touch sensor system (if present) may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof.

In some examples, the interface system 108 may include, a force sensor system. The force sensor system (if present) may be, or may include, a piezo-resistive sensor, a capacitive sensor, a thin film sensor (for example, a polymer-based thin film sensor), another type of suitable force sensor, or combinations thereof. If the force sensor system includes a piezo-resistive sensor, the piezo-resistive sensor may include silicon, metal, polysilicon, glass, or combinations thereof. In some examples, the interface system 108 may include an optical sensor system, one or more cameras, or a combination thereof.

According to some examples, the apparatus 100 may include a noise reduction system 110. For example, the noise reduction system 110 may include one or more mirrors that are configured to reflect light from the light source system 104 away from the receiver system 102. In some implementations, the noise reduction system 110 may include one or more sound-absorbing layers, acoustic isolation material, light-absorbing material, light-reflecting material, or combinations thereof. In some examples, the noise reduction system 110 may include acoustic isolation material, which may reside between the light source system 104 and at least a portion of the receiver system 102, on at least a portion of the receiver system 102, or combinations thereof. In some examples, the noise reduction system 110 may include one or more electromagnetically shielded transmission wires. In some such examples, the one or more electromagnetically shielded transmission wires may be configured to reduce electromagnetic interference from circuitry of the light source system 104, receiver system circuitry, or combinations thereof, that is received by the receiver system 102.

The apparatus 100 may be used in a variety of different contexts, many examples of which are disclosed herein. For example, in some implementations a mobile device may include the apparatus 100. In some such examples, the mobile device may be a smart phone. In some implementations, a wearable device may include the apparatus 100. The wearable device may, for example, be a bracelet, an armband, a wristband, a watch, a ring, a headband or a patch.

Figure 2:
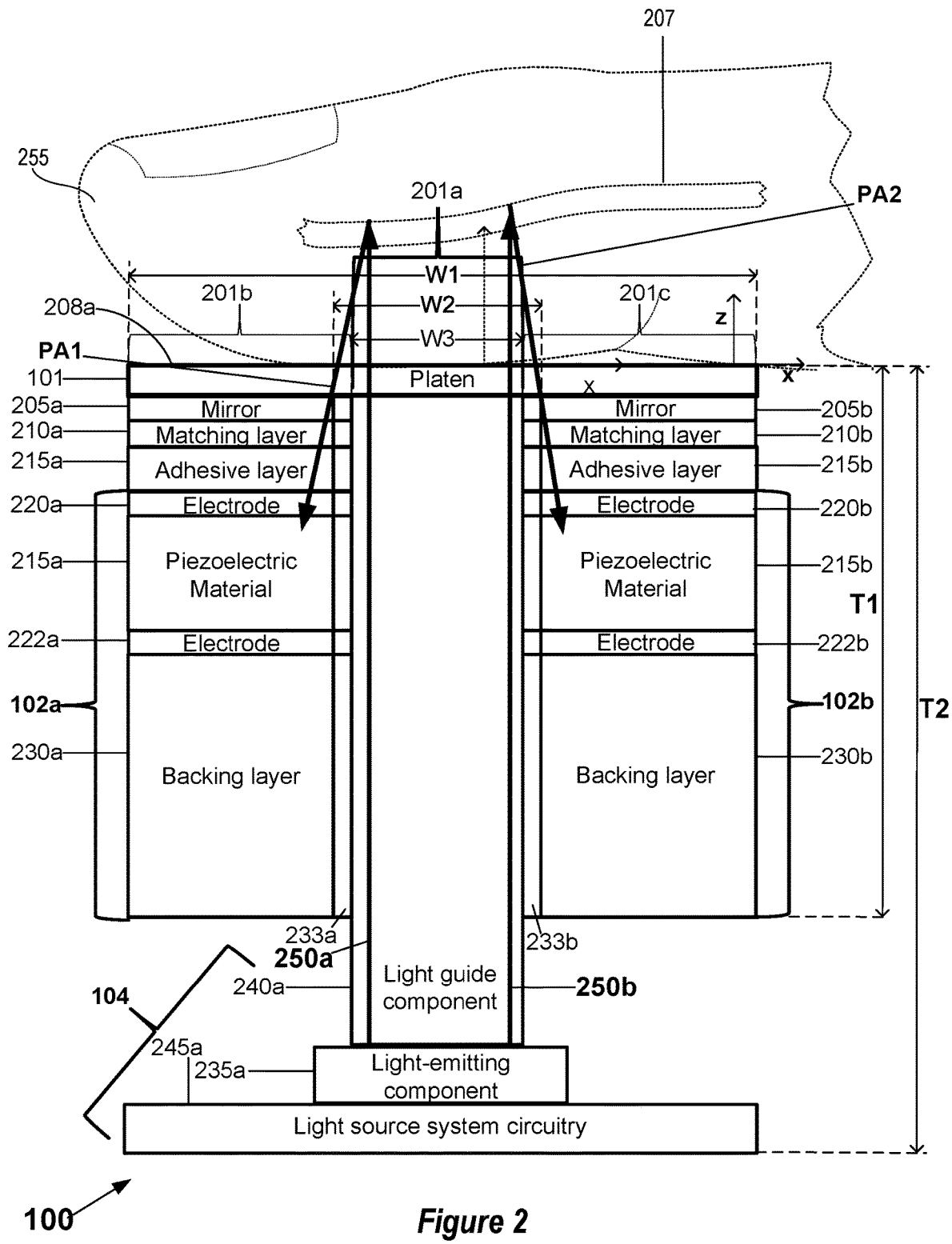
FIG. 2 shows example components of an apparatus according to some disclosed implementations.

FIG. 2 shows example components of an apparatus according to some disclosed implementations. As with other figures provided herein, the numbers, types and arrangements of elements shown in FIG. 2 are merely presented by way of example. In this example, the apparatus 100 is an instance of the apparatus 100 shown in FIG. 1. According to this example, the apparatus 100 includes a platen 101, a receiver system 102 and a light source system 104. In this example, an outer surface 208a of the platen 101 is configured to receive a target object, such as the finger 255, a wrist, etc.

According to this example, the receiver system 102, is, or includes, an ultrasonic receiver system. In this example, the receiver system 102 includes the receiver stack portion 102a and the receiver stack portion 102b. In this example, the receiver stack portion 102a includes piezoelectric material 215a, an electrode layer 220a on a first side of the piezoelectric material 215a and an electrode layer 222a on a second side of the piezoelectric material 215a. According to some examples, a layer of anisotropic conductive film (ACF) may reside between each of the electrode layers 220a and 220b and the piezoelectric material 215a. In this example, the electrode layer 222a resides between the piezoelectric material 215a and a backing layer 230a. The electrode layers 220a and 220b include conductive material, which may be, or may include, a conductive metal such as copper in some instances. The electrode layers 220a and 220b may be electrically connected to receiver system circuitry, which is not shown in FIG. 2. The receiver system circuitry may be regarded as a portion of the control system 106 that is described herein with reference to FIG. 1, as a part of the receiver system 102, or both. The piezoelectric material 215a may, for example, include a polyvinylidene difluoride (PVDF) polymer, a polyvinylidene fluoride-trifluoroethylene (PVDF-TrFE) copolymer, aluminum nitride (AlN), lead zirconate titanate (PZT), piezoelectric composite material, such as a 1-3 composite, a 2-2 composite, a 3-3 composite, etc., or combinations thereof. The backing layer 230a may be configured to suppress at least some acoustic artifacts and may provide a relatively higher signal-to-noise ratio (SNR) than receiver systems 102 that lack a backing layer. In some examples, the backing layer 230a may include metal, epoxy, or a combination thereof.

In this example, the receiver stack portion 102b includes piezoelectric material 215b, an electrode layer 220b on a first side of the piezoelectric material 215b and an electrode layer 222b on a second side of the piezoelectric material 215b. Here, the electrode layer 222b resides between the piezoelectric material 215b and a backing layer 230b. According to this example, the receiver stack portion 102a resides proximate a first side of the light guide component 240a and the receiver stack portion 102b resides proximate a second side of the light guide component 240a. In this example, the piezoelectric materials 215a and 215b are configured to produce electric signals in response to received acoustic waves, such as the photoacoustic waves PA1 and PA2.

According to this example, the light source system 104 includes at least a first light-emitting component (the light-emitting component 235a in this example), at least a first light guide component (the light guide component 240a in this example) and light source system circuitry 245a. The light-emitting component 235a may, for example, include one or more light-emitting diodes, one or more laser diodes, one or more VCSELs, one or more edge-emitting lasers, one or more neodymium-doped yttrium aluminum garnet (Nd:YAG) lasers, or combinations thereof.

The light guide component 240a may include any suitable material, or combination of materials, for causing at least some of the light emitted by the light-emitting component 235a to propagate within the light guide component 240a, for example due to total internal reflection between one or more core materials and one or more cladding materials of the light guide component 240a. In such examples, the core material(s) will have a higher index of refraction than the cladding material(s). In one specific and non-limiting example, the core material may have an index of refraction of approximately 1.64 and the cladding material may have an index of refraction of approximately 1.3. In some examples, the core material(s) may include glass, silica, quartz, plastic, zirconium fluoride, chalcogenide, or combinations thereof. According to some examples, the cladding material(s) may include polyvinyl chloride (PVC), acrylic, polytetrafluoroethylene (PTFE), silicone or fluorocarbon rubber. The light guide component 240a may, in some examples, include one or more optical fibers. As used herein, the terms "light guide" and "light pipe" may be used synonymously.

In some examples, the width W3 of the light guide component 240a may be in the range of 0.25 mm to 3 mm, for example 0.5 mm, 1.0 mm, 1.5 mm, etc. According to some examples, the width W2 of the space between the receiver stack portion 102a and the receiver stack portion 102b may be in the range of 0.5 mm to 5 mm, for example 1.0 mm, 1.5 mm, 2 mm, 2.5 mm, etc. In some examples, the space 233a between the receiver stack portion 102a and the light guide component 240a and the space 233b between the receiver stack portion 102b and the light guide component 240a, if any—in other words, the space(s) between W2 and W3, if any—may include light-absorbing material. According to some examples, the spaces 233a and 233b, if any, may include air. In some examples, the spaces 233a and 233b, if any, may include sound-absorbing material, preferably sound-absorbing material having a relatively low Gruneisen parameter.

In this example, the light source system 104 is configured to emit light through a first area of the platen towards a target object that is in contact with the first area of the platen 101. According to this example, the light source system 104 is configured to transmit light-represented in FIG. 2 by the light rays 250a and 250b-through the light guide component 240a and the platen area 201a towards the finger 255, which is in contact with the platen area 201a. In this example, an arterial wall of the artery 207 produces the photoacoustic waves PA1 and PA1 responsive to the light rays 250a and 250b, respectively.

The platen 101 may include any suitable material, such as glass, acrylic, polycarbonate, combinations thereof, etc. In some examples, the width W1 of the platen 101 may be in the range of 2 mm to 10 mm, for example 4 mm, 5 mm, 6 mm, etc. According to some examples, the thickness of the platen 101 (in the z direction of the coordinate system shown in FIG. 2) may be in the range of 50 microns to 500 microns, for example 150 microns, 200 microns, 250 microns, 300 microns, etc.

In this example, the platen 101 includes platen areas 201a, 201b and 201c. In this example, the platen area 201a resides adjacent the light guide component 240a. Accordingly, at least the platen area 201a includes transparent material in this example. According to some examples, the platen 101 may include one or more anti-reflective layers. In some examples, one or more anti-reflective layers may reside on the platen 101, or proximate the platen 101, for example on or proximate the outer surface 208a.

According to this example, the platen area 201b resides proximate the receiver stack portion 102a and the platen area 201c resides proximate the receiver stack portion 102c. In this example, a mirror layer 205a, a matching layer 210a and an adhesive layer 215a reside between the platen area 201b and the receiver stack portion 102a. Similarly, in this example a mirror layer 205b, a matching layer 210b and an adhesive layer 215b reside between the platen area 201c and the receiver stack portion 102b. The matching layers 210a and 210b may have an acoustic impedance that is selected to reduce the reflections of acoustic waves caused by the acoustic impedance contrast between one or more layers of the receiver stack portions 102a and 102b that are adjacent to, or proximate, the matching layers 210a and 210b. According to some examples, the matching layers 210a and 210b may include polyethylene terephthalate (PET). In some examples, the adhesive layers 215a and 215b may include pressure-sensitive adhesive (PSA) material.

In the example shown in FIG. 2, the apparatus has a thickness (along the z axis) of T1 from the top of the platen to the base of the backing layers 230a and 230b, and has a thickness of T2 from the top of the platen to the base of the light source system circuitry. In some examples, T2 may be in the range of 2 mm to 10 mm. According to some examples, T1 may be in the range of 1 mm to 8 mm. The backing layers 230a and 230b may be in the range of 3 mm to 7 mm in thickness, such as 4.5 mm, 5.0 mm, 5.5, mm, etc. Accordingly, implementations that lack a backing layer, or backing layers, may be substantially thinner than implementations that include a backing layer, or backing layers.

Figure 3A:
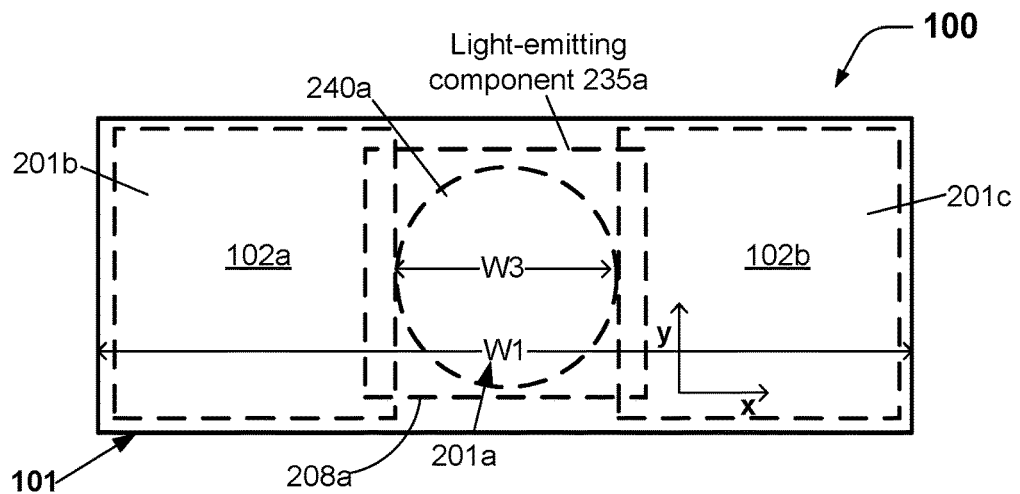
FIGS. 3A, 3B and 3C show different examples of how some components of the apparatus shown in FIG. 2 may be arranged.
Figure 3B:
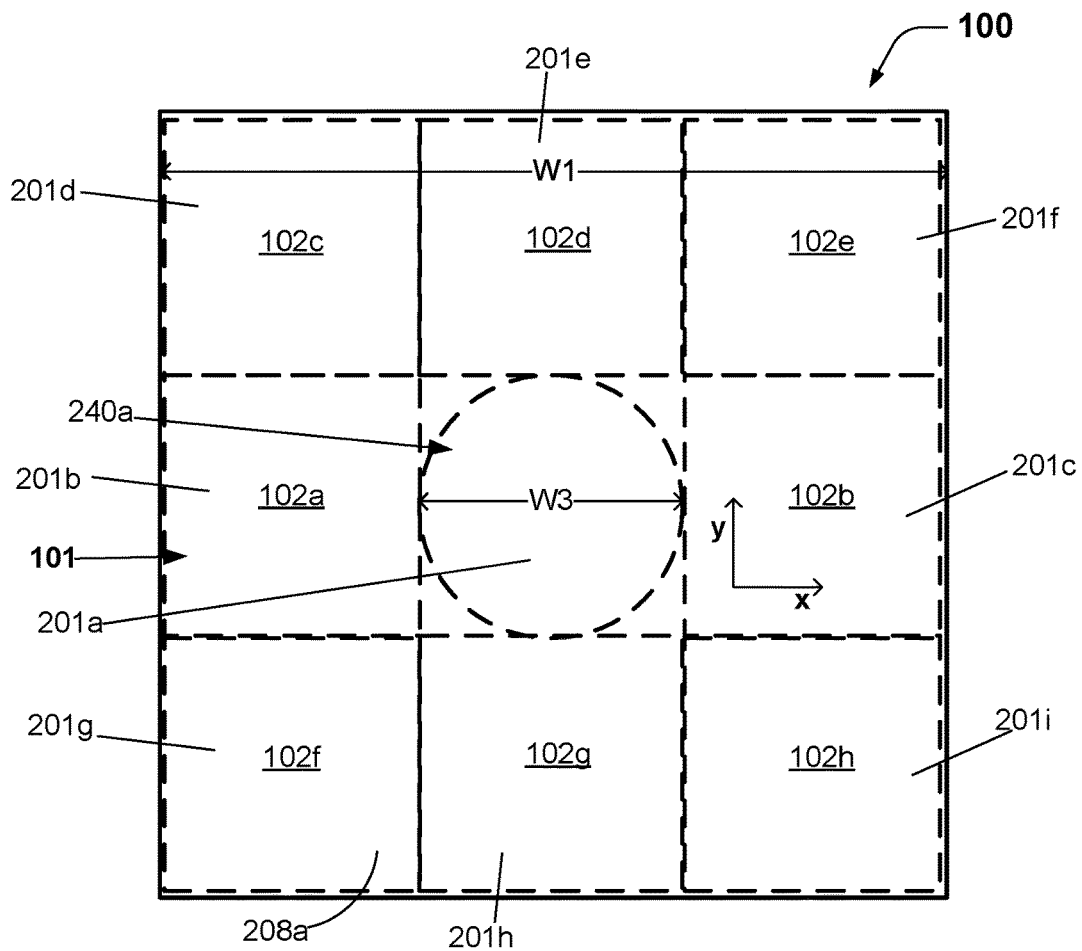
Figure 3C:
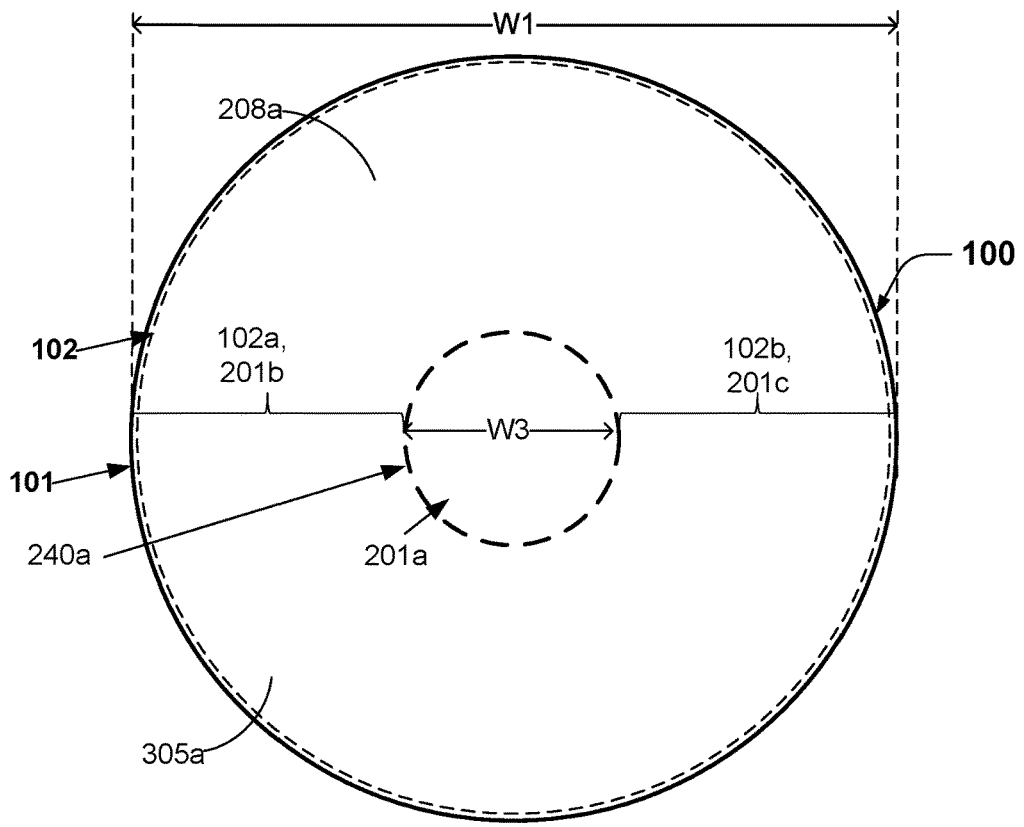

FIGS. 3A, 3B and 3C show different examples of how some components of the apparatus shown in FIG. 2 may be arranged. As with other figures provided herein, the numbers, types and arrangements of elements shown in FIGS. 3A-3C are merely presented by way of example. In these examples, the apparatus 100 is an instance of the apparatus 100 shown in FIGS. 1 and 2. In each of these examples, a top view of the apparatus 100 is shown, with the view being along the z axis of the coordinate system shown in FIG. 2. In these examples, the light guide component 240a is shown to have a circular cross-section. However, in alternative examples the light guide component 240a may have a different cross-sectional shape, such as a square cross-sectional shape, a rectangular cross-sectional shape, a hexagonal cross-sectional shape, etc.

In these examples, the outlines of the receiver stack portion 102a and the receiver stack portion 102b (and, in FIG. 3B, the outlines of the receiver stack portions 102c-102h) are shown in dashes, indicating that these elements are below the outer surface 208a of the platen 101. According to these examples, the receiver stack portion 102a resides proximate a first side of the light guide component 240a and the receiver stack portion 102b resides proximate a second side of the light guide component 240a. In these examples, the receiver stack portion 102a resides proximate (in this example, below, further away from the viewer along the z axis) platen area 102b on a first side of the platen area 102a and the receiver stack portion 102b resides proximate platen area 102c, which is on a second and opposite side of the platen area 102a.

According to the example shown in FIG. 3A, the receiver stack portion 102a and the receiver stack portion 102b are discrete elements of a linear array of receiver stack portions having N receiver elements, with N being 2 in this instance. In alternative examples, N may be greater than 2.

In the example shown in FIG. 3B, the receiver stack portion 102a and the receiver stack portion 102b are discrete elements of a two-dimensional receiver array of receiver stack portions having M receiver elements, with M being 9 in this instance. In alternative examples, M may be greater than or less than 9.

According to the example shown in FIG. 3C, the receiver stack portion 102a and the receiver stack portion 102b are portions of a receiver stack ring 305a. In this example, the receiver stack ring 305a is configured to surround the light guide component 240a. According to this example, an annular area of the platen 301 proximate (in this example, above, closer to the viewer along the z axis) the receiver stack ring 305a, which includes the platen areas 201b and 201c, is configured to surround the platen area 201a.

Figure 3D:
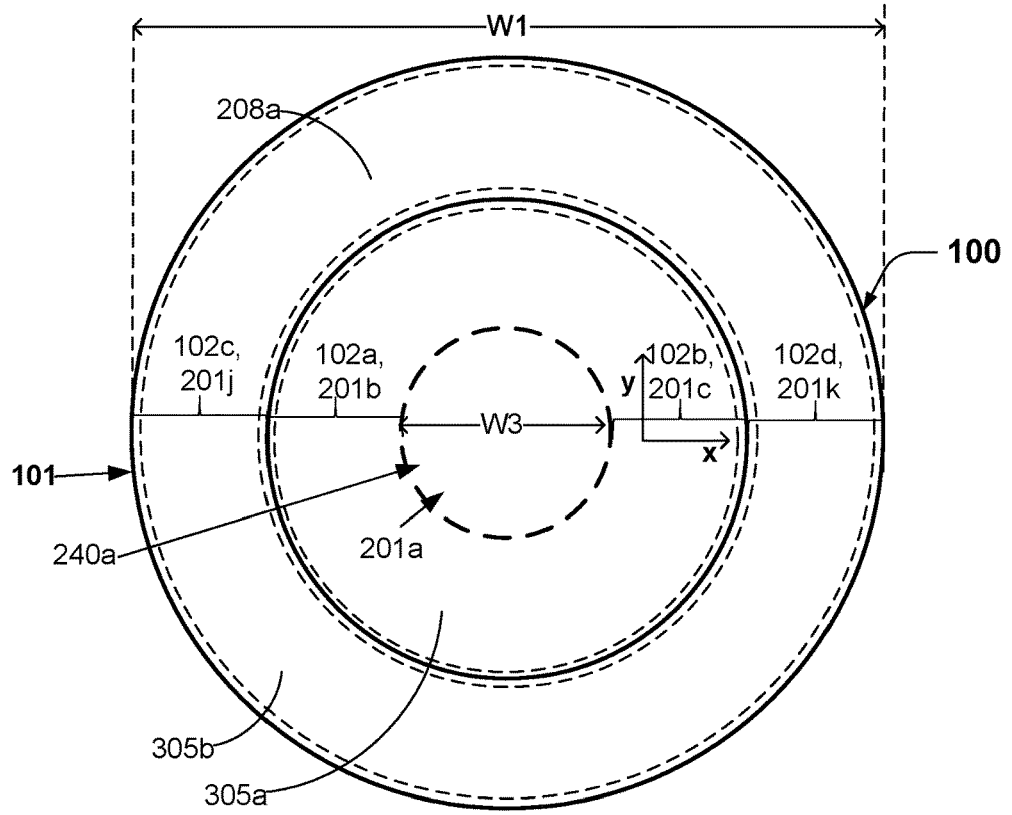
FIG. 3D shows examples of the components of the apparatus shown in FIG. 2 arranged with additional components.

FIG. 3D shows examples of the components of the apparatus shown in FIG. 2 arranged with additional components. As with other figures provided herein, the numbers, types and arrangements of elements shown in FIG. 3D are merely presented by way of example. In these examples, the apparatus 100 is an instance of the apparatus 100 shown in FIG. 1. In this example, a top view of the apparatus 100 is shown, with the view being along the z axis of the coordinate system shown in FIG. 2. In this example, the light guide component 240a is shown to have a circular cross-section. However, in alternative examples the light guide component 240a may have a different cross-sectional shape.

In this example, the receiver stack portion 102a and the receiver stack portion 102b are portions of a receiver stack ring 305a. According to this example, the receiver stack ring 305a is configured to surround the light guide component 240a. In this example, the receiver stack ring 305a includes the receiver stack portions 102a and 102b, as well as the platen areas 201b and 201c. According to this example, the receiver stack ring 305b is configured to surround the receiver stack ring 305a. In this example, the receiver stack ring 305b includes the receiver stack portions 102c and 102d, as well as the platen areas 201j and 201k.

Figure 4:
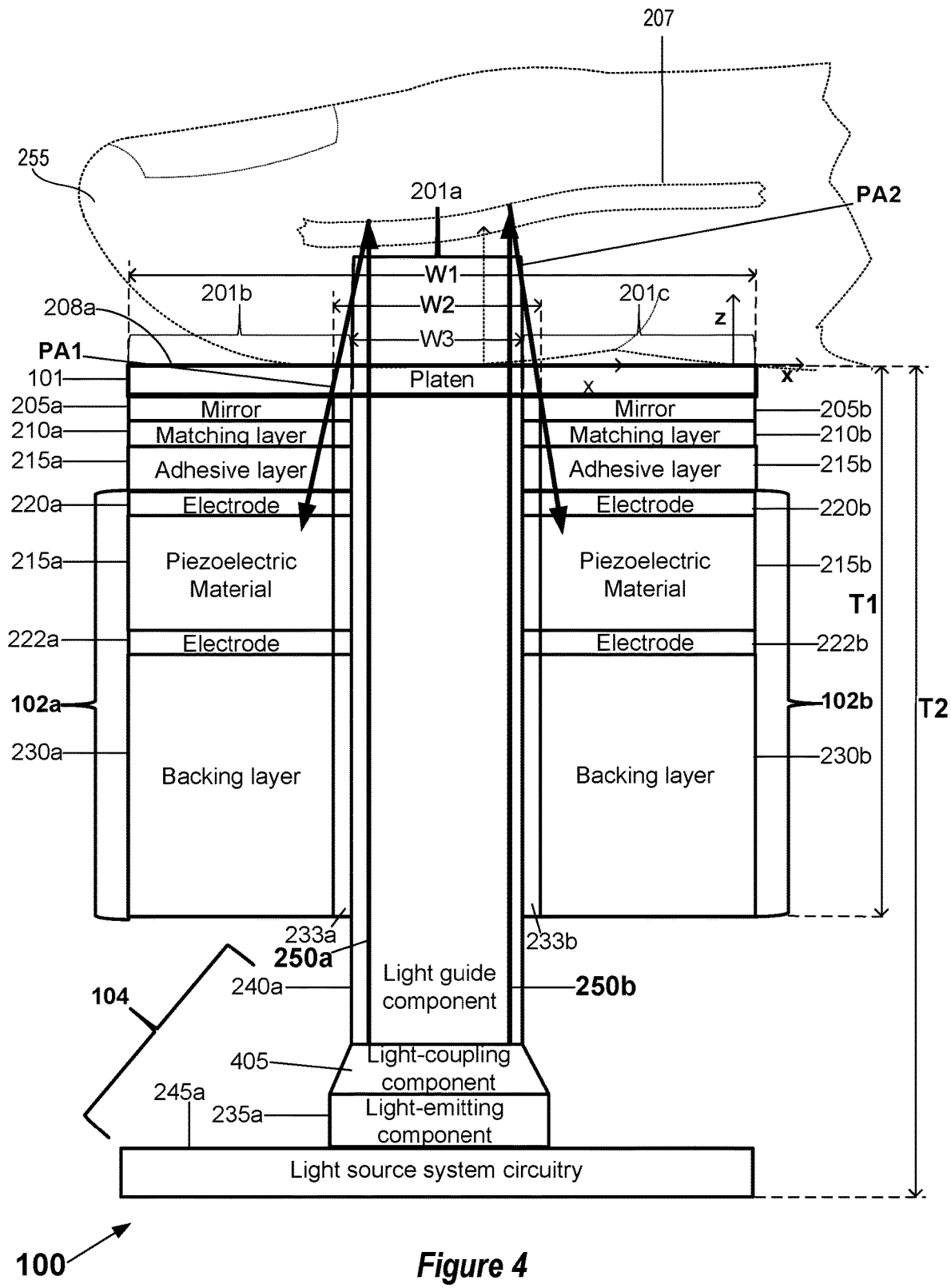
FIG. 4 shows example components of an apparatus according to some alternative implementations.

FIG. 4 shows example components of an apparatus according to some alternative implementations. As with other figures provided herein, the numbers, types and arrangements of elements shown in FIG. 4 are merely presented by way of example. In this example, the apparatus 100 is an instance of the apparatus 100 shown in FIG. 1. According to this example, the apparatus 100 includes all of the elements shown in FIG. 2. However, in this example the light source system 104 also includes a light-coupling element 405. In this example, the light-coupling element 405 is configured to couple light from the light-emitting component 235a into the light guide component 240a.

In FIG. 4, the light-coupling element 405 is represented as having a width (along the x axis) that decreases from a first side coupled to the light-emitting component 235a to a second side coupled to the light guide component 240a. In some examples, the light-coupling element 405 may include one or more of the same materials of which the light guide component 240a is formed. According to some alternative examples, the light-coupling element 405 may be, or may include, a lens that is configured to focus light from the light-emitting component 235a into the light guide component 240a. In some examples, the light coupling provided by the light-coupling element 405 may allow the light guide component 240a to have a relatively smaller width, or diameter, than the light guide component 240a of an apparatus 100 that does not include a light-coupling element 405.

Figure 5:
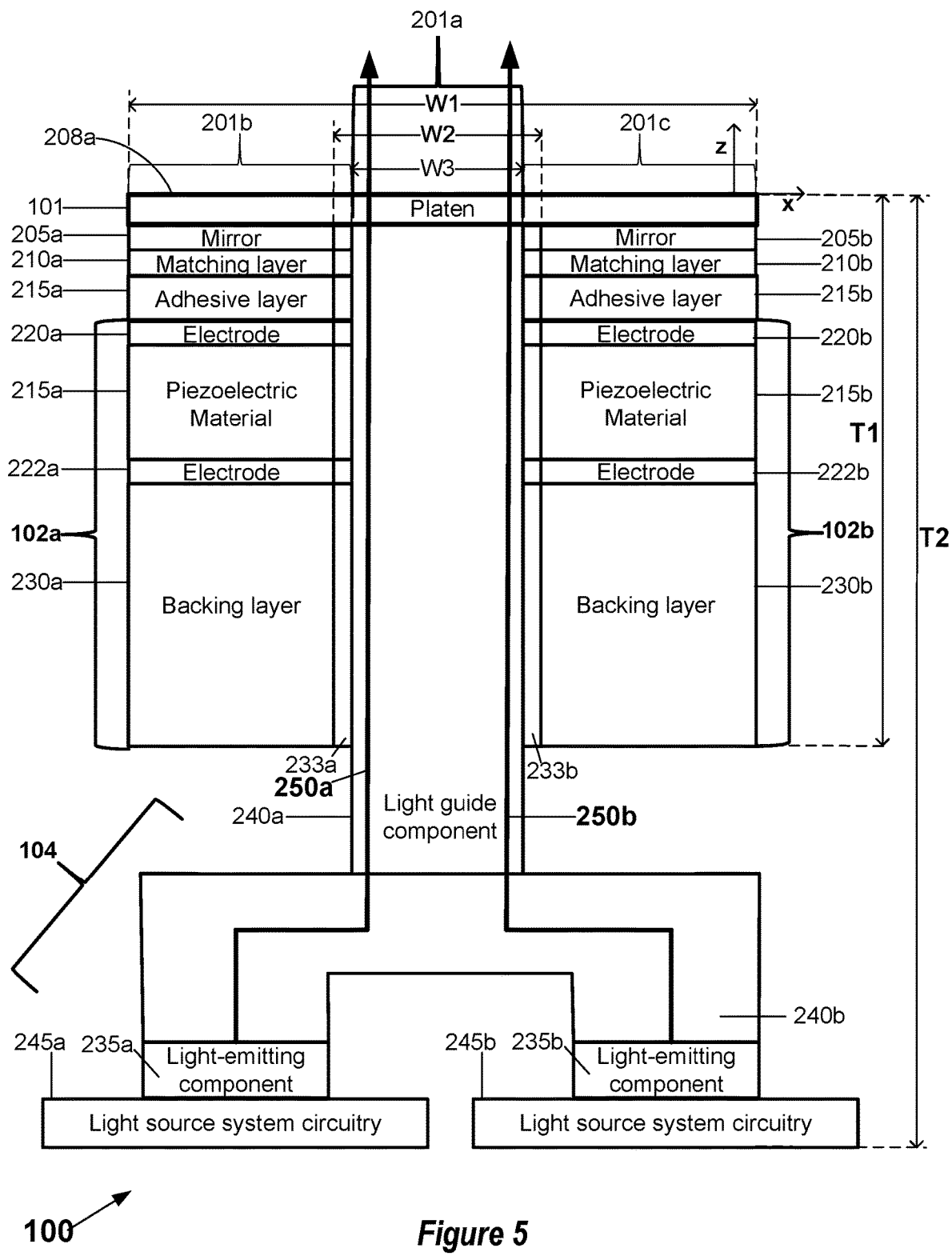
FIG. 5 shows example components of an apparatus according to some alternative implementations.

FIG. 5 shows example components of an apparatus according to some alternative implementations. As with other figures provided herein, the numbers, types and arrangements of elements shown in FIG. 5 are merely presented by way of example. In this example, the apparatus 100 is an instance of the apparatus 100 shown in FIG. 1. According to this example, the apparatus 100 includes all of the elements shown in FIG. 2. However, in this example the light source system 104 includes light-emitting components 235a and 235b, as well as light source system circuitry 245a and 245b. In this example, the light source system 104 includes L instances of light-emitting components, where L is an integer greater than 1. L equals 2 in this example. In other examples, L may be greater than 2. Accordingly, in this example the light source system includes at least a second light-emitting component and at least a second light guide component.

In this example, the light source system also includes the light guide component 240b, which is configured to transmit the light 250b from the light-emitting component 235b to the light guide component 250a. Accordingly, in this example the light source system includes at least a second light-emitting component and at least a second light guide component, the second light guide component being configured to transmit light from the second light-emitting component to at least a portion of the first light guide component. According to this example, the light guide component 240b is also configured to transmit the light 250a from the light-emitting component 235a to the light guide component 250a. Although the light guide component 240b is shown as having 90-degree bends, this is merely an example. In some implementations, the light guide component 240b may include flexible material, such as one or more optical fibers, allowing the light guide component 240b to form arcuate shapes and more gradual bends.

Figure 6:
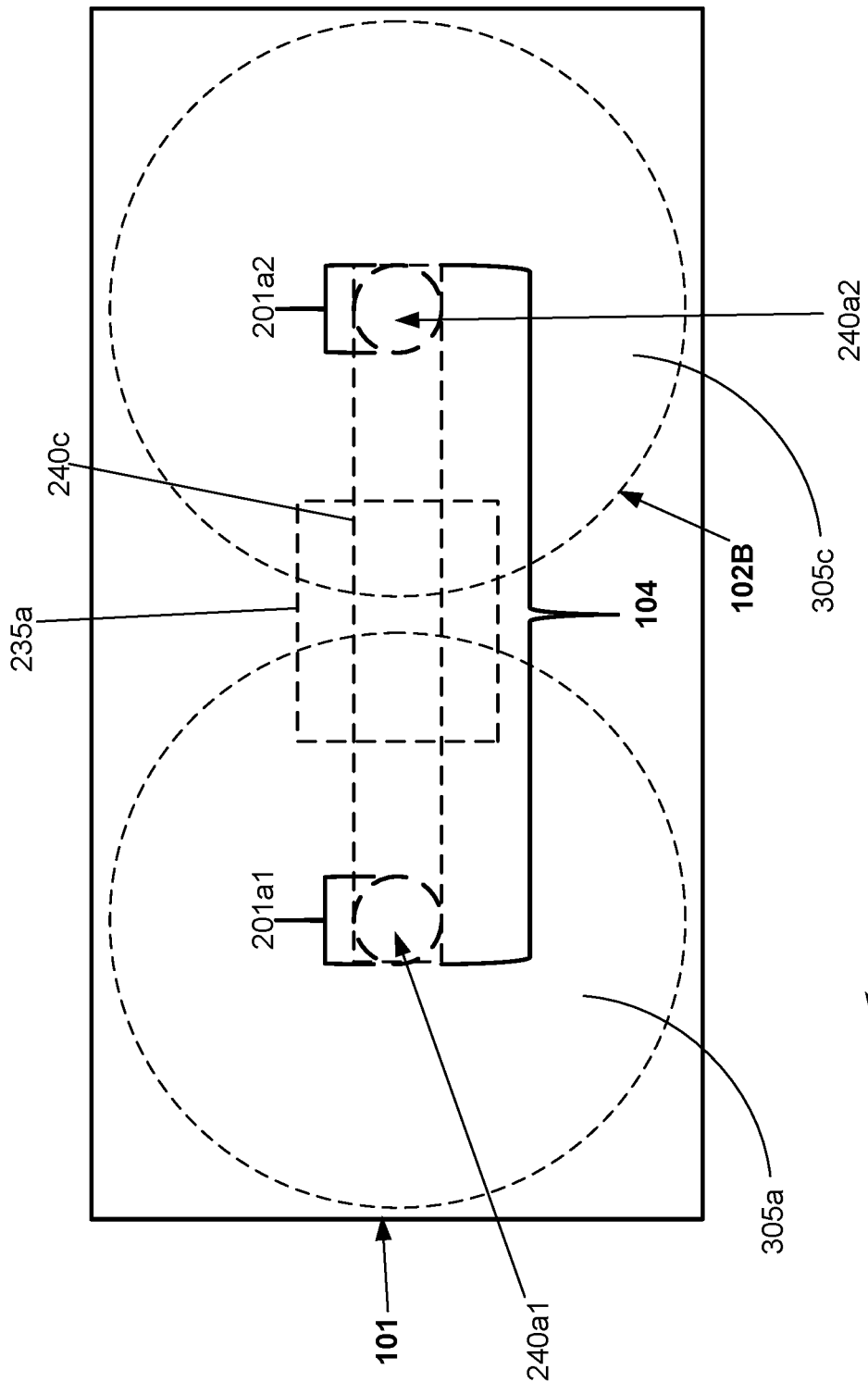
FIG. 6 shows example components of an apparatus according to some alternative implementations.

FIG. 6 shows example components of an apparatus according to some alternative implementations. As with other figures provided herein, the numbers, types and arrangements of elements shown in FIG. 6 are merely presented by way of example. In this example, the apparatus 100 is an instance of the apparatus 100 shown in FIG. 1. In this example, the light source system 104 includes at least a second light guide component that is configured to transmit light from a first light-emitting component to a second area of the platen. According to this example, a second receiver stack ring surrounds the second area of the platen.

In this example, the light source system 104 includes a light-emitting component 235a, which is configured to provide light to the platen area 240a1 of receiver stack ring 305a and to the platen area 240a2 of receiver stack ring 305c. In this example, the light-emitting component 235a is configured to provide light to the platen area 240a1 via the light guide components 240c and 240a1. According to this example, the light-emitting component 235a is configured to provide light to the platen area 240a2 via the light guide components 240c and 240a2.

Although in this example the second area of the platen—which is the area 201a2 in this instance—is surrounded by a second receiver stack ring, in other examples the second area of the platen may be adjacent to other configurations of receiver stack portions. In some alternative examples, the second area of the platen may be adjacent to receiver stack portions in a linear array, such as in the example shown in FIG. 3A. In other examples, the second area of the platen may be adjacent to receiver stack portions in a two-dimensional array, such as in the example shown in FIG. 3B.

Figure 7:
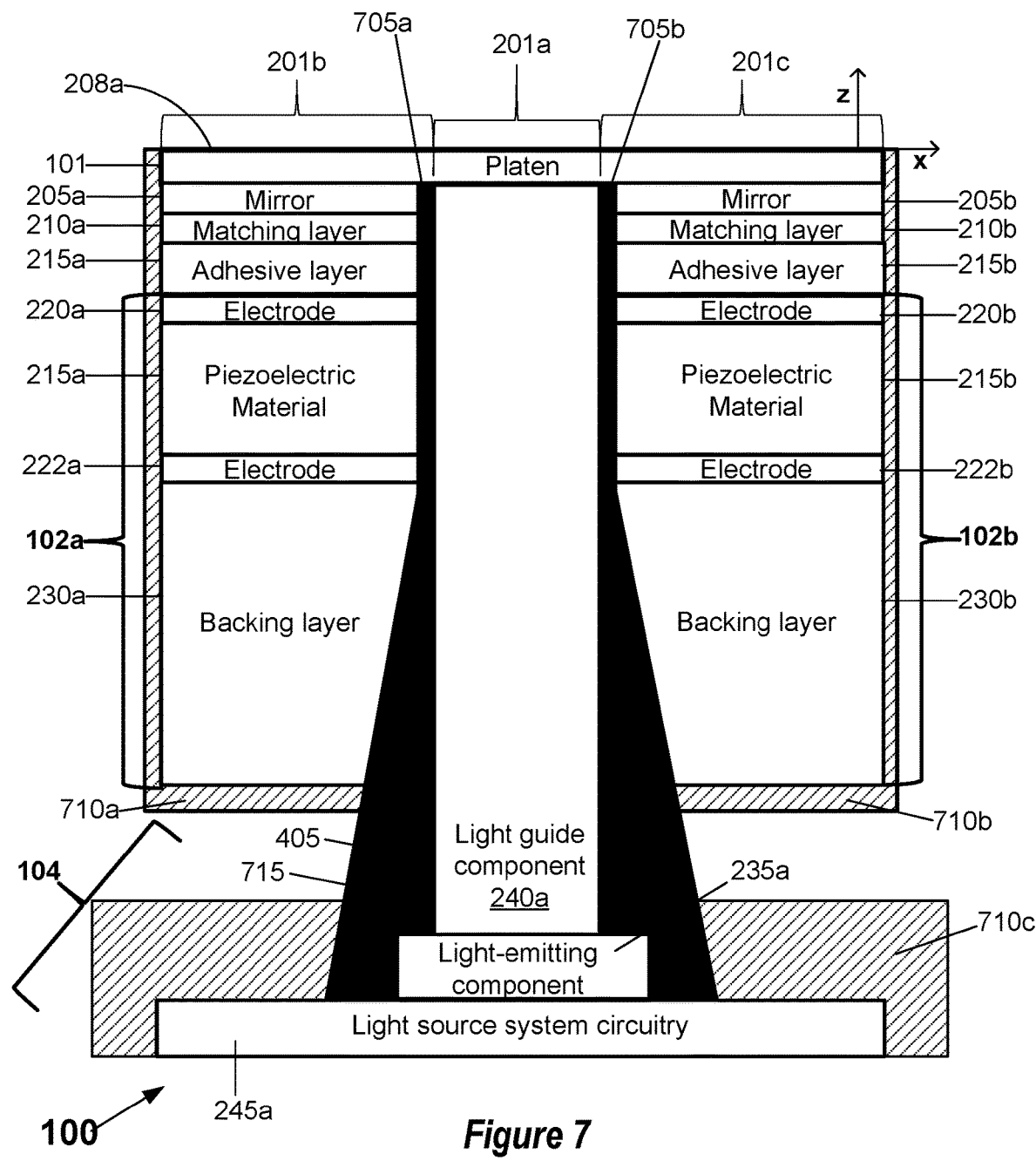
FIG. 7 shows example components of an apparatus according to some alternative implementations.

FIG. 7 shows example components of an apparatus according to some alternative implementations. As with other figures provided herein, the numbers, types and arrangements of elements shown in FIG. 7 are merely presented by way of example. In this example, the apparatus 100 is an instance of the apparatus 100 shown in FIG. 1.

As described elsewhere herein, some implementations of the apparatus 100 include one or more elements configured for noise reduction. These noise reduction elements may be considered to be part of the noise reduction system 110 that is described with reference to FIG. 1. However, such noise reduction elements may reside in various parts of the apparatus 100.

One type of noise that may be present in the apparatus 100 involves the leakage of light from the light source system 104, such as from the light guide component 240a of FIG. 7, to the receiver system 102. According to the example shown in FIG. 7, the apparatus 100 includes the light-mitigating element 705a, which resides between the light guide component 240a and the receiver stack portion 102a, and the light-mitigating element 705b, which resides between the light guide component 240a and the receiver stack portion 102b. In this example, the light-mitigating elements 705a and 705b also reside between the light guide component 240a and the mirror layers 205a and 205b, the matching layers 210a and 210b, and the adhesive layers 215a and 215b. In some examples, the light-mitigating elements 705a and 705b may be discrete elements, whereas in other examples the light-mitigating elements 705a and 705b may be portions of a continuous element, such as a cylinder that surrounds the light guide component 240a. In some examples, the light-mitigating elements 705a and 705b may include material having a relatively low index of refraction, such as a low refractive index foam. In this example, the light-mitigating elements 705a and 705b are configured to increase optical coupling and reduce optical losses.

Another type of noise that may be present in the apparatus 100 involves EMI from the light source system circuitry 245a that may be received by the receiver system 102. In the example shown in FIG. 7, the apparatus 100 includes the EMI-reducing element 710a proximate the receiver stack portion 102a and the EMI-reducing element 710b proximate the receiver stack portion 102b. In some examples, the EMI-reducing elements 710a and 710b may include one or more types of EMI shielding material. According to some examples, the EMI-reducing elements 710a and 710b may be portions of a continuous element, such as a cylinder. In this example, the EMI-reducing element 710c resides between the light source system circuitry 245a and the receiver stack portions 102a and 102b. In some examples, the EMI-reducing element 710c may surround the light source system circuitry 245a.

According to the example shown in FIG. 7, the apparatus 100 includes a light-coupling component 405, which is configured to couple light from the light-emitting component 235a into the light guide component 240a, as described above with reference to FIG. 4. In this example, the light-coupling component 405 has an outer surface 715 that is frustum-shaped. According to this example, the light-coupling component 405 resides partially between the receiver stack portions 102a and 102b and the light guide component 240a, in order to reduce the overall thickness of the apparatus 100 along the z axis. Although some other disclosed implementations are not shown to have a light-coupling component, alternative examples of such disclosed implementations may, in fact, include one or more light-coupling components.

The implementations of the apparatus 100 that are shown in FIGS. 2-7 include light source systems 104 having light-emitting components that reside below the receiver stack portions 102a and 102b and the light guide component 240a. (In this example, the term "below" means relatively further along the z axis in the negative direction with reference to another element, such as the platen 101. The reader will appreciate that the disclosed devices could be held in various orientations.) Referring to FIGS. 2 and 3A, it may be seen that in some such implementations, a first receiver stack portion resides between a first portion of the first light-emitting component and the platen and a second receiver stack portion resides between a second portion of the first light-emitting component and the platen. For example referring to FIG. 3A, it may be seen that portions of the receiver stack portions 102a and 102b overlap the light-emitting component 235a.

In various alternative implementations, light source systems 104 may have one or more light-emitting components, light source system circuitry, or combinations thereof, that are laterally displaced (also referred to herein as "laterally offset") from the receiver stack portions 102a and 102b, the light guide component 240a, or both. In some such implementations, another light guide component may extend under the receiver stack portion 102a, the receiver stack portion 102b, or both. In such implementations, the receiver stack portion 102a or the receiver stack portion 102b may reside between a second portion of the other guide component and the platen 101.

Figure 8:
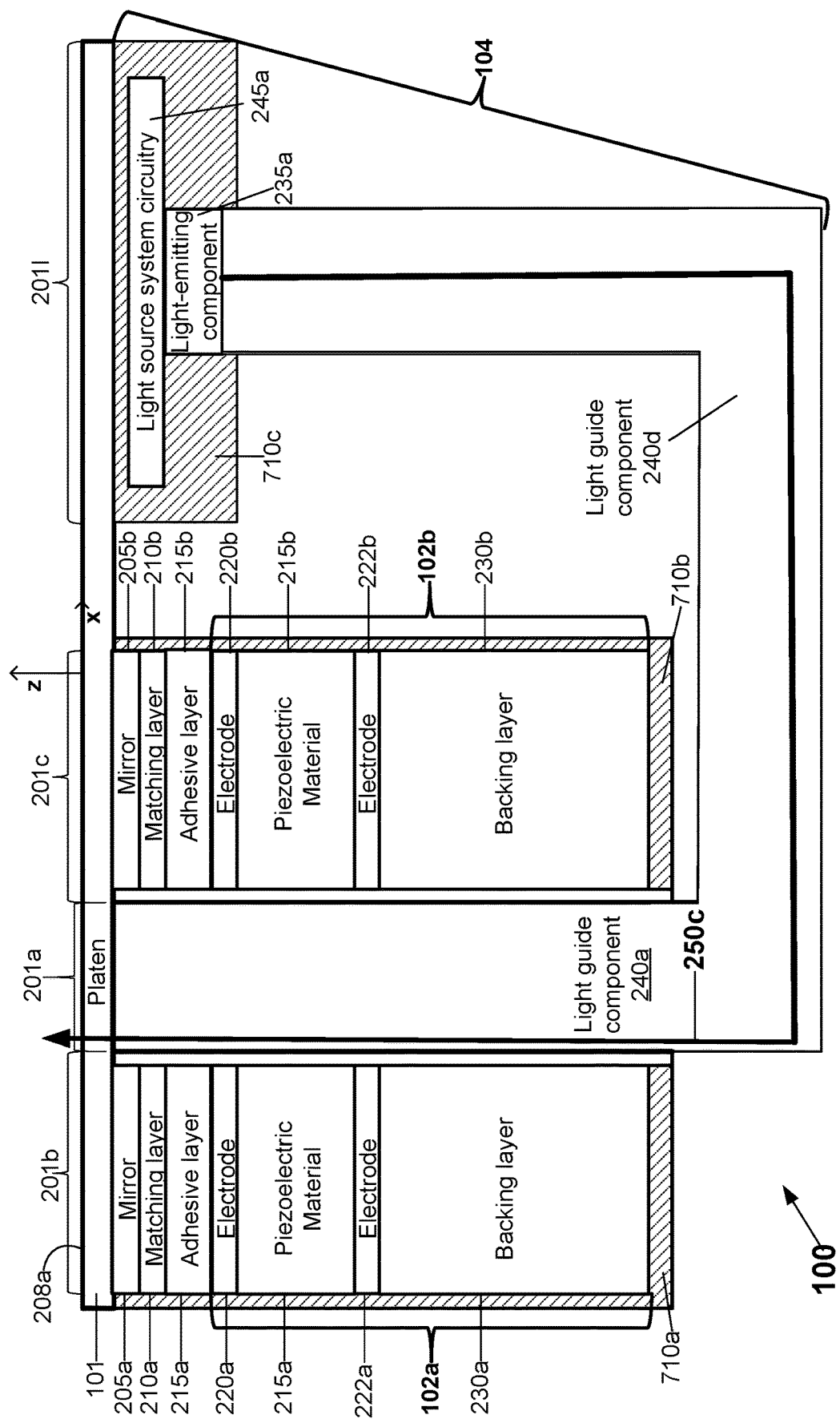
FIG. 8 shows example components of an apparatus according to some alternative implementations.

FIG. 8 shows example components of an apparatus according to some alternative implementations. As with other figures provided herein, the numbers, types and arrangements of elements shown in FIG. 8 are merely presented by way of example. In this example, the apparatus 100 is an instance of the apparatus 100 shown in FIG. 1.

In this example, the light-emitting component 235a and the light source system circuitry 245a do not reside below the receiver stack portions 102a and 102b and the light guide component 240a. Instead, according to this example, the light-emitting component 235a and the light source system circuitry 245a are laterally offset from the receiver stack portions 102a and 102b and the light guide component 240a. This separation, as well as the presence of the EMI-reducing elements 710a, 710b and 710c, can mitigate the amount of electromagnetic interference that is produced by the light source system circuitry 245a and received by the receiver system 102. In this example, the light-emitting component 235a and the light source system circuitry 245a reside proximate the platen area 201l, which is laterally offset from the platen areas 201a, 201b and 201c.

In some implementations, receiver system circuitry also may be laterally displaced from the receiver stack portions 102a and 102b and the light guide component 240a. According to some such implementations, receiver system circuitry also may be enclosed in EMI-reducing material.

In this example, the light source system 104 is configured to transmit light 250c from the light-emitting component 235a to the platen area 201a—and to a target object on the platen area 201a, if any-via the light guide components 240d and 240a. Accordingly, in this example the receiver stack portion 102b resides between the light guide component 240d and the platen 101.

Although the light guide component 240d is shown as having 90-degree bends, this is merely an example. In some implementations, the light guide component 240d may include flexible material, such as one or more optical fibers, allowing the light guide components 240d and 240a to form arcuate shapes and more gradual bends.

Examples such as that shown in FIG. 8 have the additional potential advantage of decreasing the overall thickness of the apparatus 100, in the z dimension, as compared to examples in which the light-emitting component 235a and the light source system circuitry 245a reside below the receiver stack portions 102a and 102b and the light guide component 240a. Although this difference may not seem substantial by comparing, for example, the implementations shown in FIGS. 2 and 8, this is because the drawings are not necessarily made to scale. In some implementations, the light guide components 240d and 240a may be approximately 1 mm in thickness. Therefore, implementations in which the light-emitting component 235a and the light source system circuitry 245a are laterally displaced from the receiver stack portions 102a and 102b and the light guide component 240a can reduce the overall thickness of the apparatus 100.

Figure 9:
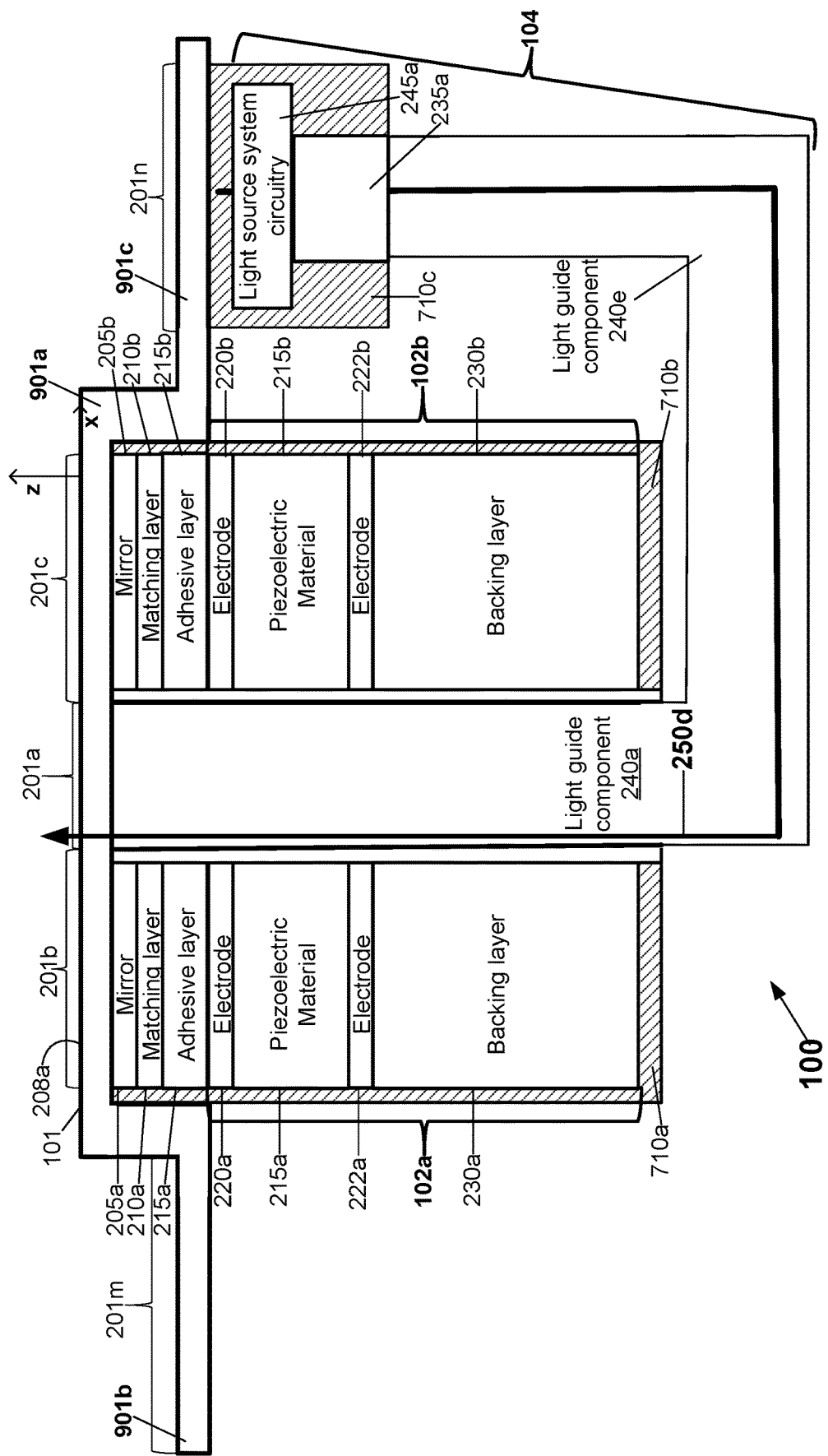
FIG. 9 shows example components of an apparatus according to some alternative implementations.

FIG. 9 shows example components of an apparatus according to some alternative implementations. As with other figures provided herein, the numbers, types and arrangements of elements shown in FIG. 9 are merely presented by way of example. In this example, the apparatus 100 is an instance of the apparatus 100 shown in FIG. 1.

The example of apparatus 100 that is shown in FIG. 9 is similar to that shown in FIG. 8: according to this example, the light-emitting component 235a and the light source system circuitry 245a are laterally offset from the receiver stack portions 102a and 102b and the light guide component 240a. In this example, the light-emitting component 235a and the light source system circuitry 245a reside proximate the platen area 201n, which is laterally offset from the platen areas 201a, 201b and 201c. In this example, the light source system 104 is configured to transmit light 250d from the light-emitting component 235a to the platen area 201a—and to a target object on the platen area 201a, if any-via the light guide components 240e and 240a. Accordingly, in this example the receiver stack portion 102b resides between the light guide component 240e and the platen 101.

However, in this example, the platen 101 includes platen portions 901a, 901b and 901c. According to this example, the platen portion 901a is elevated relative to the platen portions 901b and 901c. In this example, the receiver stack portions 102a and 102b and the light guide component 240a, reside proximate—in this example, below—the platen portion 901a. Here, the light-emitting component 235a and the light source system circuitry 245a reside below the platen portion 901c.

Accordingly, in this example the platen portion 901a, as well as the receiver stack portions 102a and 102b and the light guide component 240a, are configured to be pressed into a surface of a target object, such as a finger, a wrist, etc. Having the platen portion 901a configured to be pressed into a surface of a target object can provide potential advantages. For example, if the platen area 201a of the platen portion 901a, which is proximate the light guide component 240a, is pressed into a surface of a target object, this configuration can provide better coupling of the light 250d into the target object. If the platen areas 201b and 201c of the platen portion 901a—which are proximate the receiver stack portions 102a and 102b, respectively—are pressed into a surface of a target object, this configuration can provide better coupling of photoacoustic waves produced by the target object into the receiver stack portions 102a and 102b.

In some implementations, receiver system circuitry also may be laterally displaced from the receiver stack portions 102a and 102b and the light guide component 240a. In some such implementations, receiver system circuitry may reside proximate (in this example, below) the platen portion 901b. According to some such implementations, receiver system circuitry also may be enclosed in EMI-reducing material.

Figure 10:
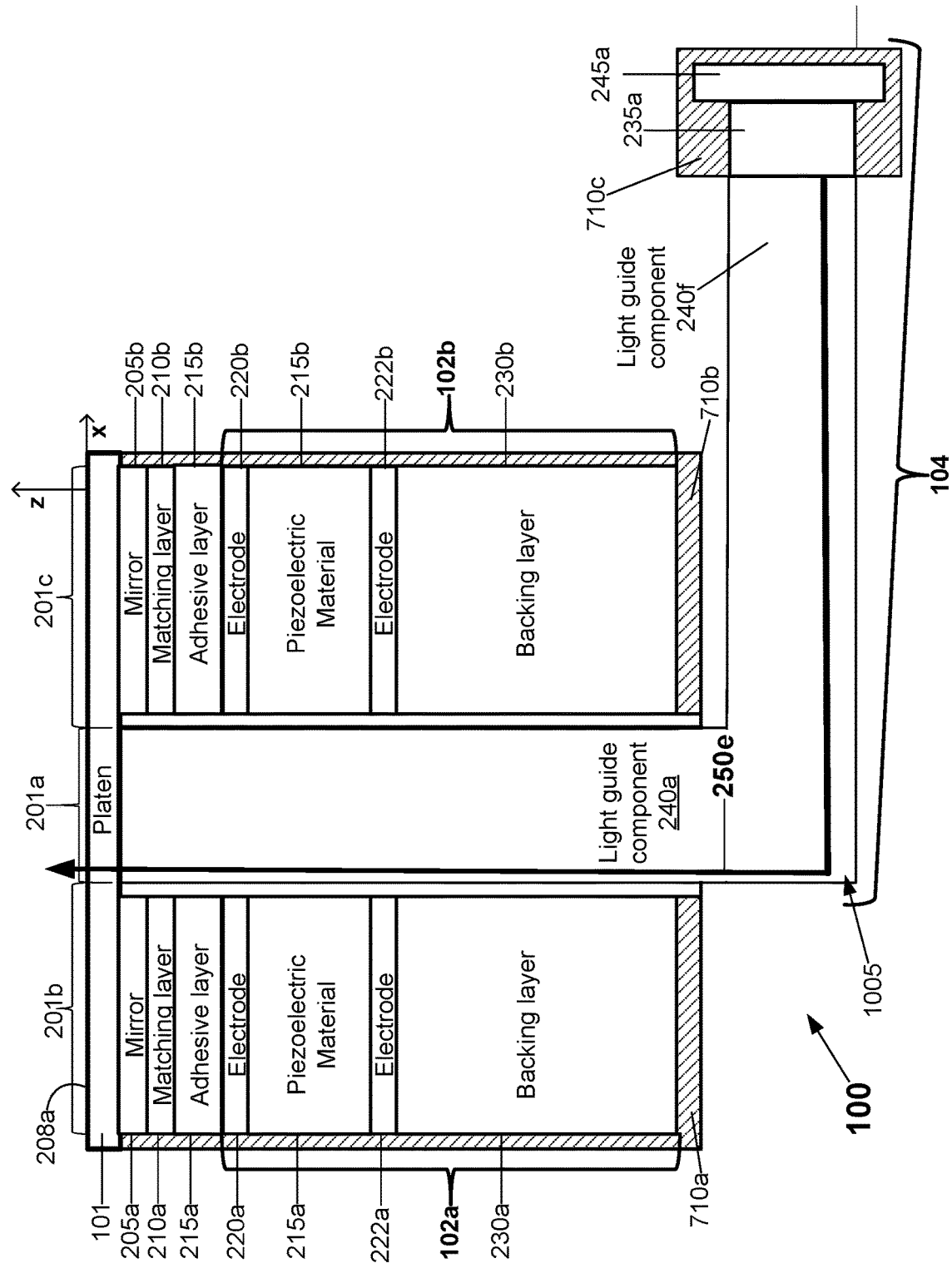
FIG. 10 shows example components of an apparatus according to some alternative implementations.

FIG. 10 shows example components of an apparatus according to some alternative implementations. As with other figures provided herein, the numbers, types and arrangements of elements shown in FIG. 10 are merely presented by way of example. In this example, the apparatus 100 is an instance of the apparatus 100 shown in FIG. 1.

The example of apparatus 100 that is shown in FIG. 10 is similar to that shown in FIG. 8: according to this example, the light-emitting component 235a and the light source system circuitry 245a are laterally offset from the receiver stack portions 102a and 102b and the light guide component 240a. In this example, the light source system 104 is configured to transmit light 250e from the light-emitting component 235a to the platen area 201a—and to a target object on the platen area 201a, if any—via the light guide components 240f and 240a. Accordingly, in this example the receiver stack portion 102b resides between the light guide component 240f and the platen 101.

However, in this example, the light guide component 240f includes only a single bend 1005, instead of the two bends in the light guide component 240d of FIG. 8. In some types of light guide components, each bend may produce at least some loss in the transmitted light. Accordingly, having relatively fewer bends can be advantageous.

According to this example, however, the light-emitting component 235a and the light source system circuitry 245a extend below (for example, further from the surface 208a of the platen 101, along the z axis) the receiver stack portions 102a and 102b. Therefore, the apparatus 100 shown in FIG. 10 may be thicker than the apparatus 100 of FIG. 8, assuming that the components are otherwise the same.

The present inventors contemplate various permutations of the examples shown in FIGS. 1-10 and the corresponding descriptions. For example, while FIGS. 2-4 and 6-10 show light source systems 104 having only a single light-emitting component 235a, in some alternative implementations each of these examples may include light source systems 104 having more than one light-emitting component. In some such examples, the light source systems 104 may include L instances of light-emitting components, where L is an integer greater than 1. In some examples, L may be 2, 3, 4, 5, 6, etc.

Similarly, while FIGS. 2, 3A, 3C, 4, 5 and 7-10 show only the receiver stack portions 102a and 102b, alternative implementations of FIGS. 2, 3A, 3C, 4, 5 and 7-10 may include additional receiver stack portions. The receiver stack portions may be arranged in one or more linear arrays, in one or more areal, two-dimensional arrays, in one or more rings, etc. The various arrangements of receiver stack portions may have one, two or more associated instances of light-emitting components.

As noted elsewhere herein, some implementations of the apparatus 100 may include a control system, which may be an instance of the control system 106 of FIG. 1. In some implementations, the control system may be configured to control the light source system 104. According to some implementations, the control system may be configured to receive, from the receiver system 102, signals corresponding to acoustic waves corresponding to a photoacoustic response of a target object to light emitted by the light source system 104.

Figure 11:
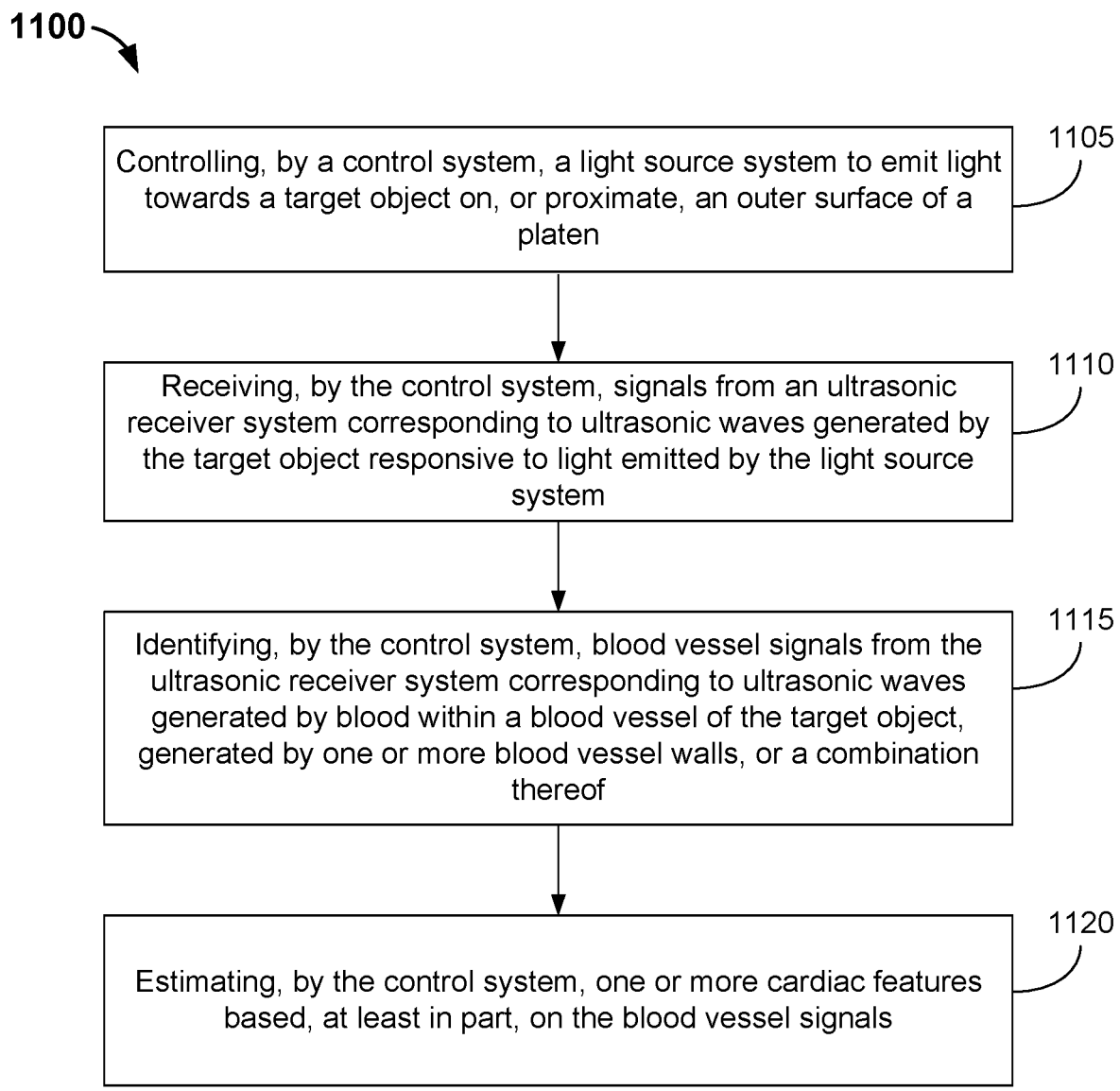
FIG. 11 is a flow diagram that shows examples of some disclosed operations.

FIG. 11 is a flow diagram that shows examples of some disclosed operations. The blocks of FIG. 11 (and those of other flow diagrams provided herein) may, for example, be performed by the apparatus 100 of FIG. 1 or by a similar apparatus. As with other methods disclosed herein, the method outlined in FIG. 11 may include more or fewer blocks than indicated. Moreover, the blocks of methods disclosed herein are not necessarily performed in the order indicated. In some instances, one or more of the blocks shown in FIG. 11 may be performed concurrently.

In this example, block 1105 involves controlling, by a control system, a light source system-which may be an instance of the light source system 104 of FIG. 1—to emit light towards a target object on, or proximate, an outer surface of a platen. The target object may be a finger, a wrist, etc., depending on the particular example. According to this example, block 1110 involves receiving, by the control system, signals from an ultrasonic receiver system-which may be an instance of the receiver system 102 of FIG. 1—corresponding to ultrasonic waves generated by the target object responsive to the light emitted by the light source system.

According to this example, block 1115 involves identifying, by the control system, blood vessel signals from the ultrasonic receiver system corresponding to ultrasonic waves generated by blood within a blood vessel of the target object, by one or more blood vessel walls, or combinations thereof. According to some examples, block 1115 may involve identifying, by the control system, arterial signals from the ultrasonic receiver system corresponding to ultrasonic waves generated by blood within an artery of the target object by one or more arterial walls, or combinations thereof. The blood vessel signals may, for example, be identified by implementing a range gate delay (RGD) that corresponds with the expected depth to a blood vessel. Alternatively, or additionally, the arterial signals may be identified according to one or more characteristics of the photoacoustic responses of the blood vessel walls, blood, or a combination thereof.

In this example, block 1120 involves estimating, by the control system, one or more cardiac features based, at least in part, on the blood vessel signals. In some examples, block 1120 may involve estimating a blood pressure based, at least in part, on the blood vessel signals. In some such examples, block 1120 may involve estimating a blood pressure based, at least in part, on arterial signals. According to some examples, block 1120, or another aspect of method 1100, may involve extracting and evaluating heart rate waveform (HRW) features.

Figure 12:
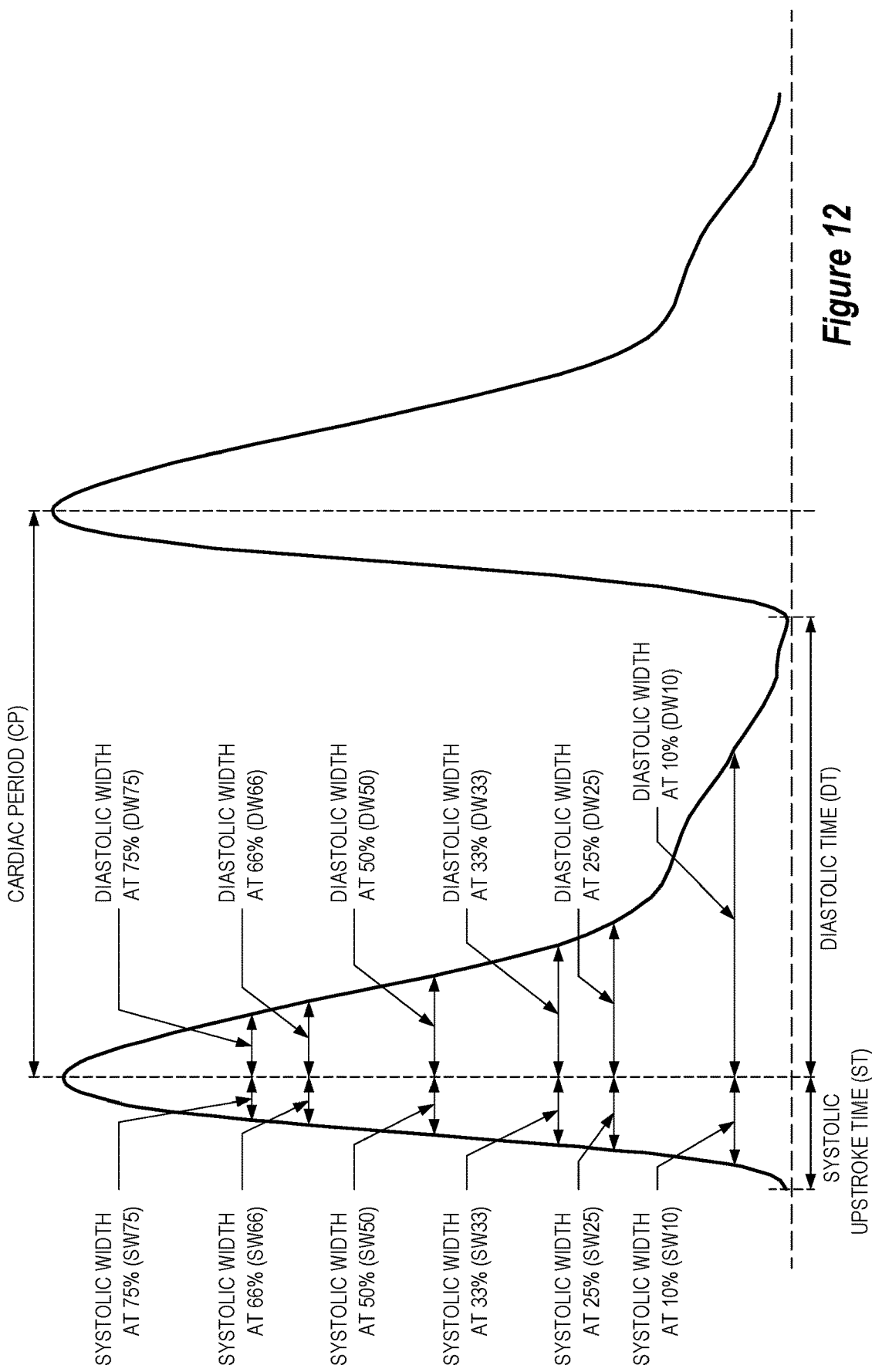
FIG. 12 shows examples of heart rate waveform (HRW) features that may be extracted according to some implementations of the method of FIG. 11.

FIG. 12 shows examples of heart rate waveform (HRW) features that may be extracted according to some implementations of the method of FIG. 11. The horizontal axis of FIG. 12 represents time and the vertical axis represents signal amplitude. The cardiac period is indicated by the time between adjacent peaks of the HRW. The systolic and diastolic time intervals are indicated below the horizontal axis. During the systolic phase of the cardiac cycle, as a pulse propagates through a particular location along an artery, the arterial walls expand according to the pulse waveform and the elastic properties of the arterial walls. Along with the expansion is a corresponding increase in the volume of blood at the particular location or region, and with the increase in volume of blood an associated change in one or more characteristics in the region. Conversely, during the diastolic phase of the cardiac cycle, the blood pressure in the arteries decreases and the arterial walls contract. Along with the contraction is a corresponding decrease in the volume of blood at the particular location, and with the decrease in volume of blood an associated change in the one or more characteristics in the region.

The HRW features that are illustrated in FIG. 12 pertain to the width of the systolic and/or diastolic portions of the HRW curve at various "heights," which are indicated by a percentage of the maximum amplitude. For example, the SW50 feature is the width of the systolic portion of the HRW curve at a "height" of 50% of the maximum amplitude. In some implementations, the HRW features used for blood pressure estimation may include some or all of the SW10, SW25, SW33, SW50, SW66, SW75, DW10, DW25, DW33, DW50, DW66 and DW75 HRW features. In other implementations, additional HRW features may be used for blood pressure estimation. Such additional HRW features may, in some instances, include the sum and ratio of the SW and DW at one or more "heights," e.g., (DW75+SW75), DW75/SW75, (DW66+SW66), DW66/SW66, (DW50+SW50), DW50/SW50, (DW33+SW33), DW33/SW33, (DW25+SW25), DW25/SW25 and/or (DW10+SW10), DW10/SW10. Other implementations may use yet other HRW features for blood pressure estimation. Such additional HRW features may, in some instances, include sums, differences, ratios and/or other operations based on more than one "height," such as (DW75+SW75)/(DW50+SW50), (DW50+SW50/(DW10+SW10), etc.

Figure 13:
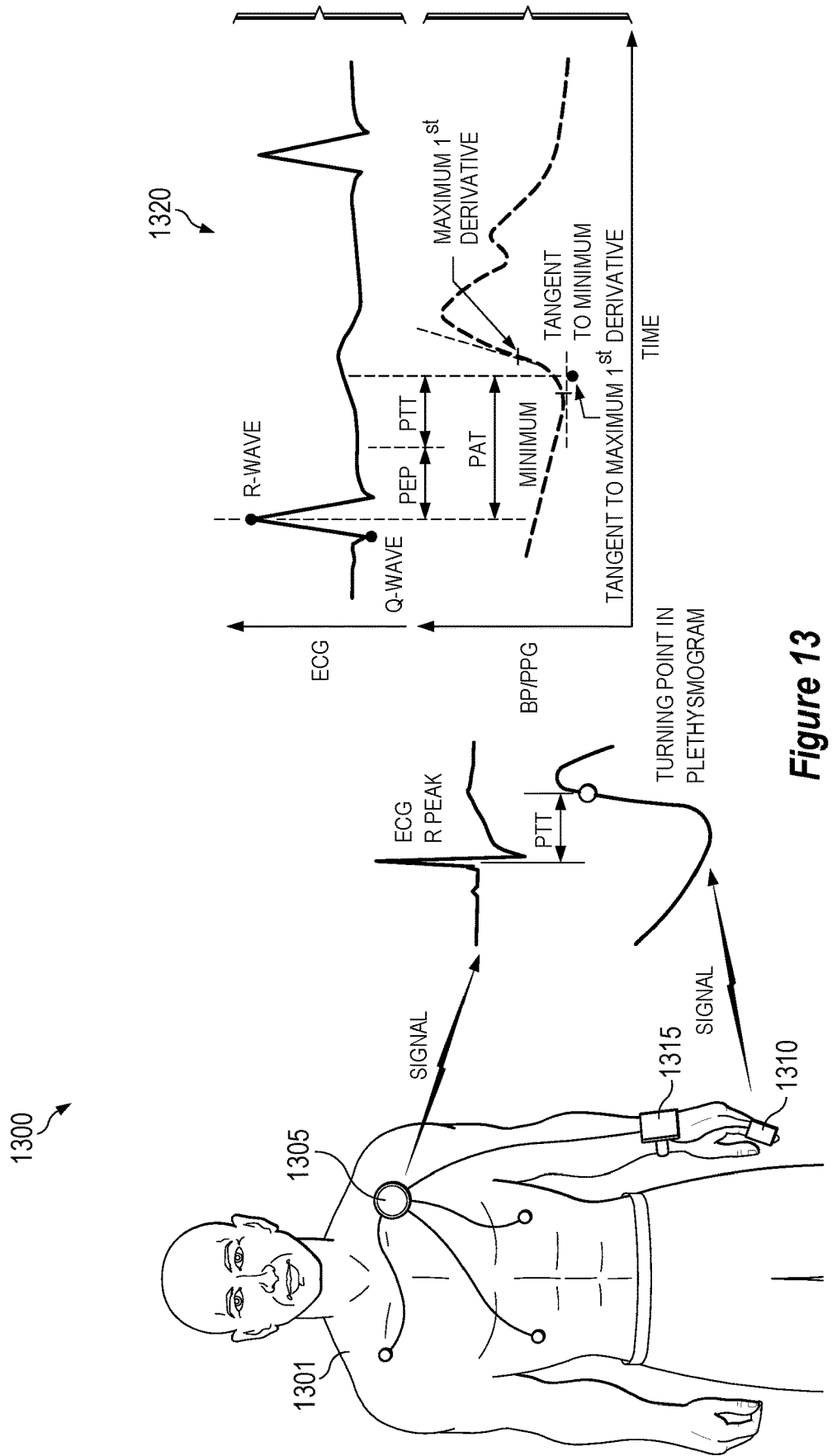
FIG. 13 shows examples of devices that may be used in a system for estimating blood pressure based, at least in part, on pulse transit time (PTT).

FIG. 13 shows examples of devices that may be used in a system for estimating blood pressure based, at least in part, on pulse transit time (PTT). As with other figures provided herein, the numbers, types and arrangements of elements are merely presented by way of example. According to this example, the system 1300 includes at least two sensors. In this example, the system 1300 includes at least an electrocardiogram sensor 1305 and a device 1310 that is configured to be mounted on a finger of the person 1301. In this example, the device 1310 is, or includes, an apparatus configured to perform at least some PAPG methods disclosed herein. For example, the device 1310 may be, or may include, the apparatus 300 of FIG. 1 or a similar apparatus.

As noted in the graph 1320, the PAT includes two components, the pre-ejection period (PEP, the time needed to convert the electrical signal into a mechanical pumping force and isovolumetric contraction to open the aortic valves) and the PTT. The starting time for the PAT can be estimated based on the QRS complex—an electrical signal characteristic of the electrical stimulation of the heart ventricles. As shown by the graph 1320, in this example the beginning of a pulse arrival time (PAT) may be calculated according to an R-Wave peak measured by the electrocardiogram sensor 1305 and the end of the PAT may be detected via analysis of signals provided by the device 1310. In this example, the end of the PAT is assumed to correspond with an intersection between a tangent to a local minimum value detected by the device 1310 and a tangent to a maximum slope/first derivative of the sensor signals after the time of the minimum value.

There are many known algorithms for blood pressure estimation based on the PTT and/or the PAT, some of which are summarized in Table 1 and described in the corresponding text on pages 5-10 of Sharma, M., et al., *Cuff-Less and Continuous Blood Pressure Monitoring: a Methodological Review* ("Sharma"), in Multidisciplinary Digital Publishing Institute (MDPI) Technologies 2017, 5, 21, both of which are hereby incorporated by reference.

Some previously-disclosed methods have involved calculating blood pressure according to one or more of the equations shown in Table 1 of Sharma, or other known equations, based on a PTT and/or PAT measured by a sensor system that includes a PPG sensor. As noted above, some disclosed PAPG-based implementations are configured to distinguish artery HRWs from other HRWs. Such implementations may provide more accurate measurements of the PTT and/or PAT, relative to those measured by a PPG sensor. Therefore, disclosed PAPG-based implementations may provide more accurate blood pressure estimations, even when the blood pressure estimations are based on previously-known formulae.

Other implementations of the system 1300 may not include the electrocardiogram sensor 1305. In some such implementations, the device 1315, which is configured to be mounted on a wrist of the person 1301, may be, or may include, an apparatus configured to perform at least some PAPG methods disclosed herein. For example, the device 1315 may be, or may include, the apparatus 200 of FIG. 2 or a similar apparatus. According to some such examples, the device 1315 may include a light source system and two or more ultrasonic receivers. One example is described below with reference to FIG. 15A. In some examples, the device 1315 may include an array of ultrasonic receivers.

In some implementations of the system 1300 that do not include the electrocardiogram sensor 1305, the device 1310 may include a light source system and two or more ultrasonic receivers. One example is described below with reference to FIG. 15B.

Figure 14:
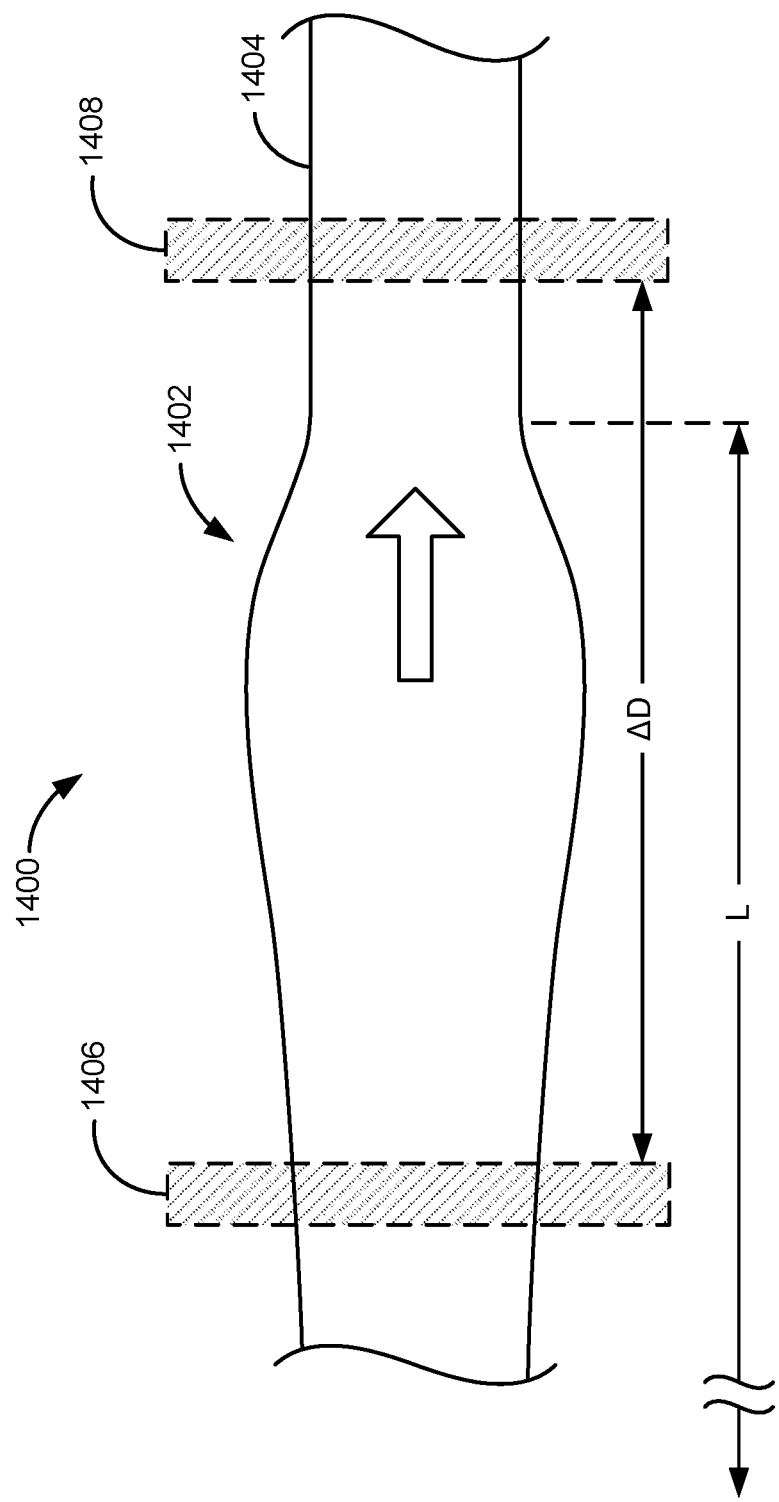
FIG. 14 shows a cross-sectional side view of a diagrammatic representation of a portion of an artery through which a pulse is propagating.

FIG. 14 shows a cross-sectional side view of a diagrammatic representation of a portion of an artery 1400 through which a pulse 1402 is propagating. The block arrow in FIG. 14 shows the direction of blood flow and pulse propagation. As diagrammatically shown, the propagating pulse 1402 causes strain in the arterial walls 1404, which is manifested in the form of an enlargement in the diameter (and consequently the cross-sectional area) of the arterial walls-referred to as "distension." The spatial length L of an actual propagating pulse along an artery (along the direction of blood flow) is typically comparable to the length of a limb, such as the distance from a subject's shoulder to the subject's wrist or finger, and is generally less than one meter (m). However, the length L of a propagating pulse can vary considerably from subject to subject, and for a given subject, can vary significantly over durations of time depending on various factors. The spatial length L of a pulse will generally decrease with increasing distance from the heart until the pulse reaches capillaries.

As described above, some particular implementations relate to devices, systems and methods for estimating blood pressure or other cardiovascular characteristics based on estimates of an arterial distension waveform. The terms "estimating," "measuring," "calculating," "inferring," "deducing," "evaluating," "determining" and "monitoring" may be used interchangeably herein where appropriate unless otherwise indicated. Similarly, derivations from the roots of these terms also are used interchangeably where appropriate; for example, the terms "estimate," "measurement," "calculation," "inference" and "determination" also are used interchangeably herein. In some implementations, the pulse wave velocity (PWV) of a propagating pulse may be estimated by measuring the pulse transit time (PTT) of the pulse as it propagates from a first physical location along an artery to another more distal second physical location along the artery. It will be appreciated that this PTT is different from the PTT that is described above with reference to FIG. 15. However, either version of the PTT may be used for the purpose of blood pressure estimation. Assuming that the physical distance $\Delta D$ between the first and the second physical locations is ascertainable, the PWV can be estimated as the quotient of the physical spatial distance $\Delta D$ traveled by the pulse divided by the time (PTT) the pulse takes in traversing the physical spatial distance $\Delta D$. Generally, a first sensor positioned at the first physical location is used to determine a starting time (also referred to herein as a "first temporal location") at which point the pulse arrives at or propagates through the first physical location. A second sensor at the second physical location is used to determine an ending time (also referred to herein as a "second temporal location") at which point the pulse arrives at or propagates through the second physical location and continues through the remainder of the arterial branch. In such examples, the PTT represents the temporal distance (or time difference) between the first and the second temporal locations (the starting and the ending times).

The fact that measurements of the arterial distension waveform are performed at two different physical locations implies that the estimated PWV inevitably represents an average over the entire path distance $\Delta D$ through which the pulse propagates between the first physical location and the second physical location. More specifically, the PWV generally depends on a number of factors including the density of the blood $\rho$, the stiffness E of the arterial wall (or inversely the elasticity), the arterial diameter, the thickness of the arterial wall, and the blood pressure. Because both the arterial wall elasticity and baseline resting diameter (for example, the diameter at the end of the ventricular diastole period) vary significantly throughout the arterial system, PWV estimates obtained from PTT measurements are inherently average values (averaged over the entire path length $\Delta D$ between the two locations where the measurements are performed).

In traditional methods for obtaining PWV, the starting time of the pulse has been obtained at the heart using an electrocardiogram (ECG) sensor, which detects electrical signals from the heart. For example, the starting time can be estimated based on the QRS complex—an electrical signal characteristic of the electrical stimulation of the heart ventricles. In such approaches, the ending time of the pulse is typically obtained using a different sensor positioned at a second location (for example, a finger). As a person having ordinary skill in the art will appreciate, there are numerous arterial discontinuities, branches, and variations along the entire path length from the heart to the finger. The PWV can change by as much as or more than an order of magnitude along various stretches of the entire path length from the heart to the finger. As such, PWV estimates based on such long path lengths are unreliable.

In various implementations described herein, PTT estimates are obtained based on measurements (also referred to as "arterial distension data" or more generally as "sensor data") associated with an arterial distension signal obtained by each of a first arterial distension sensor 1406 and a second arterial distension sensor 1408 proximate first and second physical locations, respectively, along an artery of interest. In some particular implementations, the first arterial distension sensor 1406 and the second arterial distension sensor 1408 are advantageously positioned proximate first and second physical locations between which arterial properties of the artery of interest, such as wall elasticity and diameter, can be considered or assumed to be relatively constant. In this way, the PWV calculated based on the PTT estimate is more representative of the actual PWV along the particular segment of the artery. In turn, the blood pressure P estimated based on the PWV is more representative of the true blood pressure. In some implementations, the magnitude of the distance $\Delta D$ of separation between the first arterial distension sensor 1406 and the second arterial distension sensor 1408 (and consequently the distance between the first and the second locations along the artery) can be in the range of about 1 centimeter (cm) to tens of centimeters-long enough to distinguish the arrival of the pulse at the first physical location from the arrival of the pulse at the second physical location, but close enough to provide sufficient assurance of arterial consistency. In some specific implementations, the distance $\Delta D$ between the first and the second arterial distension sensors 1406 and 1408 can be in the range of about 1 cm to about 30 cm, and in some implementations, less than or equal to about 20 cm, and in some implementations, less than or equal to about 10 cm, and in some specific implementations less than or equal to about 5 cm. In some other implementations, the distance $\Delta D$ between the first and the second arterial distension sensors 1406 and 1408 can be less than or equal to 1 cm, for example, about 0.1 cm, about 0.25 cm, about 0.5 cm or about 0.75 cm. By way of reference, a typical PWV can be about 15 meters per second (m/s). Using an ambulatory monitoring device in which the first and the second arterial distension sensors 1406 and 1408 are separated by a distance of about 5 cm, and assuming a PWV of about 15 m/s implies a PTT of approximately 3.3 milliseconds (ms).

The value of the magnitude of the distance ΔD between the first and the second arterial distension sensors 1406 and 1408, respectively, can be preprogrammed into a memory within a monitoring device that incorporates the sensors (for example, such as a memory of, or a memory configured for communication with, the control system 306 that is described above with reference to FIG. 1). As will be appreciated by a person of ordinary skill in the art, the spatial length L of a pulse can be greater than the distance ΔD from the first arterial distension sensor 1406 to the second arterial distension sensor 1408 in such implementations. As such, although the diagrammatic pulse 1402 shown in FIG. 14 is shown as having a spatial length L comparable to the distance between the first arterial distension sensor 1406 and the second arterial distension sensor 1408, in actuality each pulse can typically have a spatial length L that is greater and even much greater than (for example, about an order of magnitude or more than) the distance ΔD between the first and the second arterial distension sensors 1406 and 1408.

Sensing Architecture and Topology

In some implementations of the ambulatory monitoring devices disclosed herein, both the first arterial distension sensor 1406 and the second arterial distension sensor 1408 are sensors of the same sensor type. In some such implementations, the first arterial distension sensor 1406 and the second arterial distension sensor 1408 are identical sensors. In such implementations, each of the first arterial distension sensor 1406 and the second arterial distension sensor 1408 utilizes the same sensor technology with the same sensitivity to the arterial distension signal caused by the propagating pulses, and has the same time delays and sampling characteristics. In some implementations, each of the first arterial distension sensor 1406 and the second arterial distension sensor 1408 is configured for photoacoustic plethysmography (PAPG) sensing, e.g., as disclosed elsewhere herein. Some such implementations include a light source system and two or more ultrasonic receivers, which may be instances of the light source system 104 and the receiver system 102 of FIG. 1. In some implementations, each of the first arterial distension sensor 1406 and the second arterial distension sensor 1408 is configured for ultrasound sensing via the transmission of ultrasonic signals and the receipt of corresponding reflections. In some alternative implementations, each of the first arterial distension sensor 1406 and the second arterial distension sensor 1408 may be configured for impedance plethysmography (IPG) sensing, also referred to in biomedical contexts as bioimpedance sensing. In various implementations, whatever types of sensors are utilized, each of the first and the second arterial distension sensors 1406 and 1408 broadly functions to capture and provide arterial distension data indicative of an arterial distension signal resulting from the propagation of pulses through a portion of the artery proximate to which the respective sensor is positioned. For example, the arterial distension data can be provided from the sensor to a processor in the form of voltage signal generated or received by the sensor based on an ultrasonic signal or an impedance signal sensed by the respective sensor.

As described above, during the systolic phase of the cardiac cycle, as a pulse propagates through a particular location along an artery, the arterial walls expand according to the pulse waveform and the elastic properties of the arterial walls. Along with the expansion is a corresponding increase in the volume of blood at the particular location or region, and with the increase in volume of blood an associated change in one or more characteristics in the region. Conversely, during the diastolic phase of the cardiac cycle, the blood pressure in the arteries decreases and the arterial walls contract. Along with the contraction is a corresponding decrease in the volume of blood at the particular location, and with the decrease in volume of blood an associated change in the one or more characteristics in the region.

In the context of bioimpedance sensing (or impedance plethysmography), the blood in the arteries has a greater electrical conductivity than that of the surrounding or adjacent skin, muscle, fat, tendons, ligaments, bone, lymph or other tissues. The susceptance (and thus the permittivity) of blood also is different from the susceptances (and permittivities) of the other types of surrounding or nearby tissues. As a pulse propagates through a particular location, the corresponding increase in the volume of blood results in an increase in the electrical conductivity at the particular location (and more generally an increase in the admittance, or equivalently a decrease in the impedance). Conversely, during the diastolic phase of the cardiac cycle, the corresponding decrease in the volume of blood results in an increase in the electrical resistivity at the particular location (and more generally an increase in the impedance, or equivalently a decrease in the admittance).

A bioimpedance sensor generally functions by applying an electrical excitation signal at an excitation carrier frequency to a region of interest via two or more input electrodes, and detecting an output signal (or output signals) via two or more output electrodes. In some more specific implementations, the electrical excitation signal is an electrical current signal injected into the region of interest via the input electrodes. In some such implementations, the output signal is a voltage signal representative of an electrical voltage response of the tissues in the region of interest to the applied excitation signal. The detected voltage response signal is influenced by the different, and in some instances time-varying, electrical properties of the various tissues through which the injected excitation current signal is passed. In some implementations in which the bioimpedance sensor is operable to monitor blood pressure, heartrate or other cardiovascular characteristics, the detected voltage response signal is amplitude- and phase-modulated by the time-varying impedance (or inversely the admittance) of the underlying arteries, which fluctuates synchronously with the user's heartbeat as described above. To determine various biological characteristics, information in the detected voltage response signal is generally demodulated from the excitation carrier frequency component using various analog or digital signal processing circuits, which can include both passive and active components.

In some examples incorporating ultrasound sensors, measurements of arterial distension may involve directing ultrasonic waves into a limb towards an artery, for example, via one or more ultrasound transducers. Such ultrasound sensors also are configured to receive reflected waves that are based, at least in part, on the directed waves. The reflected waves may include scattered waves, specularly reflected waves, or both scattered waves and specularly reflected waves. The reflected waves provide information about the arterial walls, and thus the arterial distension.

In some implementations, regardless of the type of sensors utilized for the first arterial distension sensor 1406 and the second arterial distension sensor 1408, both the first arterial distension sensor 1406 and the second arterial distension sensor 1408 can be arranged, assembled or otherwise included within a single housing of a single ambulatory monitoring device. As described above, the housing and other components of the monitoring device can be configured such that when the monitoring device is affixed or otherwise physically coupled to a subject, both the first arterial distension sensor 1406 and the second arterial distension sensor 1408 are in contact with or in close proximity to the skin of the user at first and second locations, respectively, separated by a distance ΔD, and in some implementations, along a stretch of the artery between which various arterial properties can be assumed to be relatively constant. In various implementations, the housing of the ambulatory monitoring device is a wearable housing or is incorporated into or integrated with a wearable housing. In some specific implementations, the wearable housing includes (or is connected with) a physical coupling mechanism for removable non-invasive attachment to the user. The housing can be formed using any of a variety of suitable manufacturing processes, including injection molding and vacuum forming, among others. In addition, the housing can be made from any of a variety of suitable materials, including, but not limited to, plastic, metal, glass, rubber and ceramic, or combinations of these or other materials. In particular implementations, the housing and coupling mechanism enable full ambulatory use. In other words, some implementations of the wearable monitoring devices described herein are non-invasive, not physically-inhibiting and generally do not restrict the free uninhibited motion of a subject's arms or legs, enabling continuous or periodic monitoring of cardiovascular characteristics such as blood pressure even as the subject is mobile or otherwise engaged in a physical activity. As such, the ambulatory monitoring device facilitates and enables long-term wearing and monitoring (for example, over days, weeks or a month or more without interruption) of one or more biological characteristics of interest to obtain a better picture of such characteristics over extended durations of time, and generally, a better picture of the user's health.

Figure 15A:
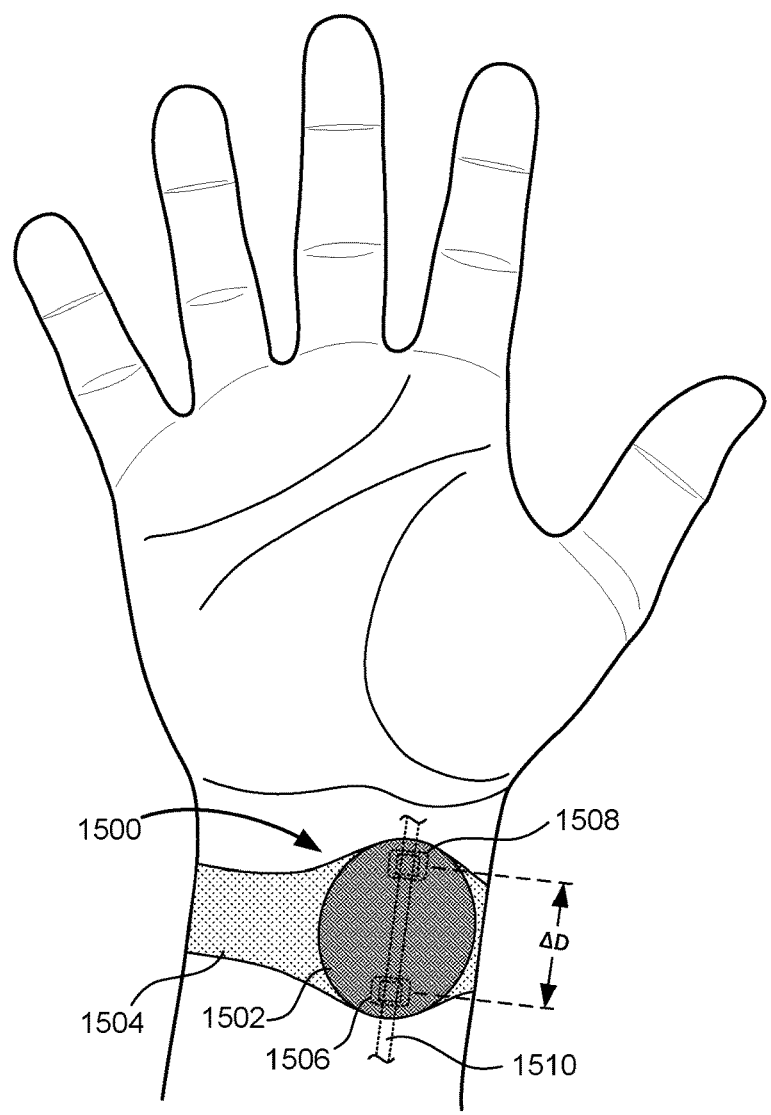
FIG. 15A shows an example ambulatory monitoring device designed to be worn around a wrist according to some implementations.

In some implementations, the ambulatory monitoring device can be positioned around a wrist of a user with a strap or band, similar to a watch or fitness/activity tracker. FIG. 15A shows an example ambulatory monitoring device 1500 designed to be worn around a wrist according to some implementations. In the illustrated example, the monitoring device 1500 includes a housing 1502 integrally formed with, coupled with or otherwise integrated with a wristband 1504. The first and the second arterial distension sensors 1506 and 1508 may, in some instances, each include an instance of the ultrasonic receiver system 102 and a portion of the light source system 104 that are described above with reference to FIG. 1. In this example, the ambulatory monitoring device 1500 is coupled around the wrist such that the first and the second arterial distension sensors 1506 and 1508 within the housing 1502 are each positioned along a segment of the radial artery 1510 (note that the sensors are generally hidden from view from the external or outer surface of the housing facing the subject while the monitoring device is coupled with the subject, but exposed on an inner surface of the housing to enable the sensors to obtain measurements through the subject's skin from the underlying artery). Also as shown, the first and the second arterial distension sensors 1506 and 1508 are separated by a fixed distance ΔD. In some other implementations, the ambulatory monitoring device 1500 can similarly be designed or adapted for positioning around a forearm, an upper arm, an ankle, a lower leg, an upper leg, or a finger (all of which are hereinafter referred to as "limbs") using a strap or band.

Figure 15B:
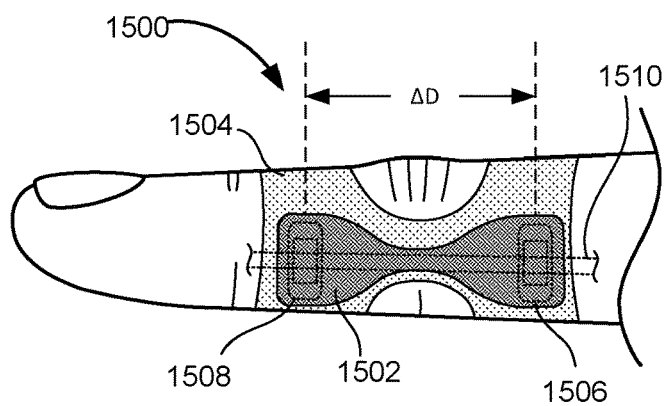
FIG. 15B shows an example ambulatory monitoring device 1500 designed to be worn on a finger according to some implementations.

FIG. 15B shows an example ambulatory monitoring device 1500 designed to be worn on a finger according to some implementations. The first and the second arterial distension sensors 1506 and 1508 may, in some instances, each include an instance of the ultrasonic receiver 102 and a portion of the light source system 104 that are described above with reference to FIG. 1.

In some other implementations, the ambulatory monitoring devices disclosed herein can be positioned on a region of interest of the user without the use of a strap or band. For example, the first and the second arterial distension sensors 1506 and 1508 and other components of the monitoring device can be enclosed in a housing that is secured to the skin of a region of interest of the user using an adhesive or other suitable attachment mechanism (an example of a "patch" monitoring device).

Figure 15C:
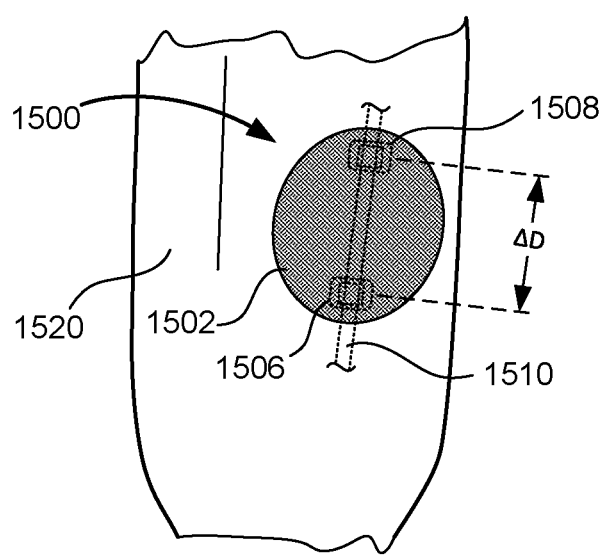
FIG. 15C shows an example ambulatory monitoring device 1500 designed to reside on an earbud according to some implementations.

FIG. 15C shows an example ambulatory monitoring device 1500 designed to reside on an earbud according to some implementations. According to this example, the ambulatory monitoring device 1500 is coupled to the housing of an earbud 1520. The first and second arterial distension sensors 1506 and 1508 may, in some instances, each include an instance of the ultrasonic receiver 102 and a portion of the light source system 104 that are described above with reference to FIG. 1.

Implementation examples are described in the following numbered clauses:

1. An apparatus, including: a platen; a light source system configured to emit light through a first area of the platen towards a target object in contact with the first area of the platen, the light source system including at least a first light-emitting component and at least a first light guide component, the first light guide component being configured to transmit light from the first light-emitting component to the first area of the platen; and a receiver system including at least two receiver stack portions, a first receiver stack portion residing proximate a first side of a first portion of the first light guide component and a second receiver stack portion residing proximate a second side of the first portion of the first light guide component, the receiver system being configured to detect acoustic waves corresponding to a photoacoustic response of the target object to light emitted by the light source system.
2. The apparatus of clause 1, where the first receiver stack portion resides proximate a second area of the platen on a first side of the first area and where the second receiver stack portion resides proximate a third area of the platen on a second and opposite side of the first area.
3. The apparatus of clause 1 or clause 2, where the first receiver stack portion and the second receiver stack portion are portions of a first receiver stack ring.
4. The apparatus of clause 3, where the first receiver stack ring is configured to surround the first portion of the first light guide component.
5. The apparatus of clause 3 or clause 4, where an annular area of the platen proximate the first receiver stack ring is configured to surround the first area of the platen.
6. The apparatus of any one of clauses 3-5, further including a second receiver stack ring.
7. The apparatus of clause 6, where the second receiver stack ring is configured to surround the first receiver stack ring.
8. The apparatus of clause 6, where the light source system includes at least a second light guide component, the second light guide component being configured to transmit light from the first light-emitting component to a second area of the platen, where the second receiver stack ring surrounds the second area of the platen.
9. The apparatus of any one of clauses 1-8, where the light source system includes at least a second light-emitting component and at least a second light guide component, the second light guide component being configured to transmit light from the second light-emitting component to at least a portion of the first light guide component.
10. The apparatus of any one of clauses 1-9, where the receiver system includes a linear array of receiver stack portions.
11. The apparatus of any one of clauses 1-10, where the receiver system includes a two-dimensional array of receiver stack portions.
12. The apparatus of any one of clauses 1-11, where the first receiver stack portion resides between a first portion of the first light-emitting component and the platen and where the second receiver stack portion resides between a second portion of the first light-emitting component and the platen.
13. The apparatus of any one of clauses 1-12, where at least one of the first receiver stack portion or the second receiver stack portion resides between a second portion of the first light guide component and the platen.
14. The apparatus of clause 13, further including at least one electromagnetic shielding layer residing between the first light-emitting component and the receiver system.
15. The apparatus of any one of clauses 1-14, where the light source system includes at least a first light-coupling component configured to couple light from the first light-emitting component to the first light guide component.
16. The apparatus of any one of clauses 1-15, where the first light-emitting component is configured to emit laser pulses.
17. The apparatus of clause 16, where the laser pulses are in a wavelength range of 500 nm to 1000 nm.
18. The apparatus of clause 16 or clause 17, where the first light-emitting component is configured to emit laser pulses at pulse widths in a range from 3 nanoseconds to 1000 nanoseconds.
19. The apparatus of any one of clauses 1-18, where at least the first area of the platen is transparent.
20. The apparatus of any one of clauses 1-19, where a combined thickness of the platen and the receiver stack portions is in a range from 2 mm to 8 mm.
21. The apparatus of any one of clauses 1-20, further including a mirror system including a first mirror portion residing between the platen and the first receiver stack portion and a second mirror portion residing between the platen and the second receiver stack portion.
22. The apparatus of any one of clauses 1-21, where the first light guide component includes at least one optical fiber.
23. The apparatus of any one of clauses 1-22, further including a control system configured to control the light source system.
24. The apparatus of clause 23, where the control system is further configured to receive, from the receiver system, signals corresponding to the acoustic waves.
25. The apparatus of clause 24, where the control system is further configured to estimate one or more cardiac features based, at least in part, on the signals.
26. An apparatus, including: a platen; light source means for emitting light through a first area of the platen towards a target object in contact with the first area of the platen, the light source means including at least a first light-emitting component and at least a first light guide component, the first light guide component being configured to transmit light from the first light-emitting component to the first area of the platen; and a receiver system including at least two receiver stack portions, a first receiver stack portion residing proximate a first side of a first portion of the first light guide component and a second receiver stack portion residing proximate a second side of the first portion of the first light guide component, the receiver system being configured to detect acoustic waves corresponding to a photoacoustic response of the target object to light emitted by the light source means.
27. The apparatus of clause 26, where the first receiver stack portion resides proximate a second area of the platen on a first side of the first area and where the second receiver stack portion resides proximate a third area of the platen on a second and opposite side of the first area.
28. The apparatus of clause 26 or clause 27, where the first receiver stack portion and the second receiver stack portion are portions of a first receiver stack ring.
29. A method, including: causing a light source system to emit light through a first area of a platen towards a target object in contact with the first area of the platen, the light source system including at least a first light-emitting component and at least a first light guide component, the first light guide component being configured to transmit light from the first light-emitting component to the first area of the platen; and receiving, from a receiver system, signals corresponding to acoustic waves caused by a photoacoustic response of the target object to light emitted by the light source system, where the receiver system includes at least two receiver stack portions, a first receiver stack portion residing proximate a first side of a first portion of the first light guide component and a second receiver stack portion residing proximate a second side of the first portion of the first light guide component.
30. The method of clause 29, where causing the light source system to emit light involves causing the light source system to emit laser pulses. As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Various modifications to the implementations described in this disclosure may be readily apparent to those skilled in the art, and the generic principles defined herein may be applied to other implementations without departing from the spirit or scope of this disclosure. Thus, the following claims are not intended to be limited to the implementations shown herein, but are to be accorded the widest scope consistent with this disclosure, the principles and the novel features disclosed herein.

Additionally, certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, various ones of the described and illustrated operations can itself include and collectively refer to a number of sub-operations. For example, each of the operations described above can itself involve the execution of a process or algorithm. Furthermore, various ones of the described and illustrated operations can be combined or performed in parallel in some implementations. Similarly, the separation of various system components in the implementations described above should not be understood as requiring such separation in all implementations. As such, other implementations are within the scope of the following claims. In some cases, the actions recited in the claims can be performed in a different order and still achieve desirable results.

What is claimed is:

1. An apparatus, comprising:
    a platen;
    a light source system configured to emit light through a first area of the platen towards a target object in contact with the first area of the platen, the light source system including at least a first light-emitting component and at least a first light guide component, the first light guide component being configured to transmit light from the first light-emitting component to the first area of the platen;
    a receiver system including at least two receiver stack portions, a first receiver stack portion residing proximate a first side of a first portion of the first light guide component and a second receiver stack portion residing proximate a second side of the first portion of the first light guide component, the receiver system being configured to detect acoustic waves corresponding to a photoacoustic response of the target object to light emitted by the light source system;
    a first light-mitigating element residing between the first receiver stack portion and the first side of the first portion of the first light guide component;
    a second light-mitigating element residing between the second receiver stack portion and the second side of the first portion of the first light guide component; and
    a noise reduction system including one or more mirrors configured to reflect light from the light source system away from the receiver system, wherein:
        the first light-mitigating element resides between a first mirror portion of the noise reduction system and the first side of the first portion of the first light guide component; and
        the second light-mitigating element resides between a second mirror portion of the noise reduction system and the second side of the first portion of the first light guide component.

2. The apparatus of claim 1, wherein the first receiver stack portion resides proximate a second area of the platen on a first side of the first area and wherein the second receiver stack portion resides proximate a third area of the platen on a second and opposite side of the first area.

3. The apparatus of claim 1, wherein the first receiver stack portion and the second receiver stack portion are portions of a first receiver stack ring.

4. The apparatus of claim 3, wherein the first receiver stack ring is configured to surround the first portion of the first light guide component.

5. The apparatus of claim 3, wherein an annular area of the platen proximate the first receiver stack ring is configured to surround the first area of the platen.

6. The apparatus of claim 3, further comprising a second receiver stack ring.

7. The apparatus of claim 6, wherein the second receiver stack ring is configured to surround the first receiver stack ring.

8. The apparatus of claim 6, wherein the light source system includes at least a second light guide component, the second light guide component being configured to transmit light from the first light-emitting component to a second area of the platen, wherein the second receiver stack ring surrounds the second area of the platen.

9. The apparatus of claim 1, wherein the light source system includes at least a second light-emitting component and at least a second light guide component, the second light guide component being configured to transmit light from the second light-emitting component to at least a portion of the first light guide component.

10. The apparatus of claim 1, wherein the receiver system includes a linear array of receiver stack portions.

11. The apparatus of claim 1, wherein the receiver system includes a two-dimensional array of receiver stack portions.

12. The apparatus of claim 1, wherein the first receiver stack portion resides between a first portion of the first light-emitting component and the platen and wherein the second receiver stack portion resides between a second portion of the first light-emitting component and the platen.

13. The apparatus of claim 1, wherein at least one of the first receiver stack portion or the second receiver stack portion resides between a second portion of the first light guide component and the platen.

14. The apparatus of claim 13, further comprising at least one electromagnetic shielding layer residing between the first light-emitting component and the receiver system.

15. The apparatus of claim 1, wherein the light source system includes at least a first light-coupling component configured to couple light from the first light-emitting component to the first light guide component.

16. The apparatus of claim 1, wherein the first light-emitting component is configured to emit laser pulses.

17. The apparatus of claim 16, wherein the laser pulses are in a wavelength range of 500 nm to 1000 nm.

18. The apparatus of claim 16, wherein the first light-emitting component is configured to emit laser pulses at pulse widths in a range from 3 nanoseconds to 1000 nanoseconds.

19. The apparatus of claim 1, wherein at least the first area of the platen is transparent.

20. The apparatus of claim 1, wherein a combined thickness of the platen and the receiver stack portions is in a range from 2 mm to 8 mm.

21. The apparatus of claim 1, wherein the first mirror portion resides between the platen and the first receiver stack portion and the second mirror portion resides between the platen and the second receiver stack portion.

22. The apparatus of claim 1, wherein the first light guide component includes at least one optical fiber.

23. The apparatus of claim 1, further comprising a control system configured to control the light source system.

24. The apparatus of claim 23, wherein the control system is further configured to receive, from the receiver system, signals corresponding to the acoustic waves.

25. The apparatus of claim 24, wherein the control system is further configured to estimate one or more cardiac features based, at least in part, on the signals.

26. An apparatus, comprising:
a platen;
light source means for emitting light through a first area of the platen towards a target object in contact with the first area of the platen, the light source means including at least a first light-emitting component and at least a first light guide component, the first light guide component being configured to transmit light from the first light-emitting component to the first area of the platen;
a receiver system including at least two receiver stack portions, a first receiver stack portion residing proximate a first side of a first portion of the first light guide component and a second receiver stack portion residing proximate a second side of the first portion of the first light guide component, the receiver system being configured to detect acoustic waves corresponding to a photoacoustic response of the target object to light emitted by the light source means;
a first light-mitigating element residing between the first receiver stack portion and the first side of the first portion of the first light guide component;
a second light-mitigating element residing between the second receiver stack portion and the second side of the first portion of the first light guide component; and
a noise reduction system including one or more mirrors configured to reflect light from the light source means away from the receiver system, wherein:
the first light-mitigating element resides between a first mirror portion of the noise reduction system and the first side of the first portion of the first light guide component; and
the second light-mitigating element resides between a second mirror portion of the noise reduction system and the second side of the first portion of the first light guide component.

27. The apparatus of claim 26, wherein the first receiver stack portion resides proximate a second area of the platen on a first side of the first area and wherein the second receiver stack portion resides proximate a third area of the platen on a second and opposite side of the first area.

28. The apparatus of claim 26, wherein the first receiver stack portion and the second receiver stack portion are portions of a first receiver stack ring.

* * * * *